United States Patent
Xu et al.

(10) Patent No.: US 10,291,446 B2
(45) Date of Patent: May 14, 2019

(54) CLOCK SYNCHRONIZATION METHOD, RECEIVER, TRANSMITTER, AND CLOCK SYNCHRONIZATION SYSTEM

(71) Applicant: Huawei Technologies Co., Ltd., Shenzhen (CN)

(72) Inventors: Chuan Xu, Wuhan (CN); Cong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/965,362

(22) Filed: Apr. 27, 2018

(65) Prior Publication Data

US 2018/0248721 A1    Aug. 30, 2018

Related U.S. Application Data

(63) Continuation of application No. PCT/CN2015/093354, filed on Oct. 30, 2015.

(51) Int. Cl.
*H04L 27/00* (2006.01)
*H04J 3/06* (2006.01)
(Continued)

(52) U.S. Cl.
CPC ........ *H04L 27/0014* (2013.01); *H04J 3/0632* (2013.01); *H04J 3/0658* (2013.01);
(Continued)

(58) Field of Classification Search
CPC ...... H04J 3/0632; H04J 3/0658; H04J 3/0664; H04J 3/0638; H04L 2012/5674; H04N 21/242; H04N 21/8547
(Continued)

(56) References Cited

U.S. PATENT DOCUMENTS 5,260,978 A    11/1993 Fleischer et al.
7,349,409 B1 *  3/2008 Restivo et al. ....... H04J 3/0632
                                                      370/395.62
(Continued)

FOREIGN PATENT DOCUMENTS

| CN | 101686185 A | 3/2010 |
|---|---|---|
| CN | 102957403 A | 3/2013 |
| CN | 103905136 A | 7/2014 |

OTHER PUBLICATIONS

Machine Translation and Abstract of Chinese Publication No. CN101686185, Mar. 31, 2010, 8 pages.
(Continued)

*Primary Examiner* — Leila Malek
(74) *Attorney, Agent, or Firm* — Conley Rose, P.C.

(57) ABSTRACT

A clock synchronization method, a receiver, a transmitter, and a clock synchronization system, where the method includes obtaining a common reference clock signal, determining $B_t$ according to the common reference clock signal and $Mr_d(t-1)$, where $$B_t = \mathrm{mod}\left[\sum_{n=0}^{t-1} Mr_d(n), 2^P\right],$$

determining that $Mr_d(t-1)$ is a target $Mr_d$ when $C_t$ obtained by means of calculation according to $Mr_d(t-1)$ is less than or equal to a threshold, where $C_t=B_t-A_t$, $A_t$ is included in a residual time stamp (RTS) packet received by a receiver last time from the transmitter, and
(Continued)

$$A_t = \mod\left[\sum_{n=0}^{t} M_d(n), 2^p\right],$$

performing frequency division on the common reference clock signal using the target $Mr_d$ as a frequency dividing coefficient to obtain a first clock signal, and performing frequency multiplication processing on the first clock signal to obtain a service clock signal. Hence, random phase offset may be avoided.

20 Claims, 8 Drawing Sheets

(51) Int. Cl.
*H04L 7/00* (2006.01)
*H04Q 11/04* (2006.01)

(52) U.S. Cl.
CPC .......... *H04L 7/0012* (2013.01); *H04L 7/0037* (2013.01); *H04Q 11/0478* (2013.01); *H04L 2027/0048* (2013.01)

(58) Field of Classification Search
USPC ........................................... 375/344
See application file for complete search history.

(56) References Cited

U.S. PATENT DOCUMENTS

2003/0063625 A1*  4/2003  Belk et al. ............ H04J 3/0685
                                                         370/503
2013/0043904 A1     2/2013  Ivory

OTHER PUBLICATIONS

Machine Translation and Abstract of Chinese Publication No. CN103905136, Jul. 2, 2014, 10 pages.
"Series G: Transmission Systems and Media, Digital Systems and Networks, Packet over Transport aspects—Quality and availability targets, Series Y: Global Information Infrastructure, Internet Protocol Aspects and Next-Generation Networks, Internet protocol aspects—Transport, Timing and synchronization aspects in packet networks," ITU-T G.8261/Y.1361, Aug. 2013, 116 pages.
"Series I: Integrated Services Digital Network Overall network aspects and functions—Protocol layer requirements B-ISDN ATM Adaptation Layer specification: Type 1 AAL," ITU-T I.363.1, Aug. 1996, 47 pages.
Foreign Communication From a Counterpart Application, PCT Application No. PCT/CN2015/093354, English Translation of International Search Report dated Jul. 14, 2016, 2 pages.
Foreign Communication From a Counterpart Application, PCT Application No. PCT/CN2015/093354, English Translation of Written Opinion dated Jul. 14, 2016, 6 pages.
Cockburn B. F., et al., "Simplified Jitter Analysis and Performance-enhancing Extensions for the SRTS Mode of ATM AAL-1," XP010244918, IEEE Pacific Rim Conference on Communications, Computers, and Signals Processing, vol. 1, Aug. 20-22, 1997, pp. 61-65.
Walker, J., et al., "Determining Parameters to Minimize Jitter Generation in the SRTS Method", IEEE Transactions on Communications, vol. 46, No. 1, XP011009108, Jan. 1, 1998, pp. 82-90.
Foreign Communication From a Counterpart Application, European Application No. 15906993.9, Extended European Search Report dated Sep. 18, 2018, 12 pages.

* cited by examiner

CLOCK SYNCHRONIZATION METHOD, RECEIVER, TRANSMITTER, AND CLOCK SYNCHRONIZATION SYSTEM

CROSS-REFERENCE TO RELATED APPLICATIONS

This application is a continuation of International Patent Application No. PCT/CN2015/093354 filed on Oct. 30, 2015, which is hereby incorporated by reference in its entirety.

TECHNICAL FIELD

The present disclosure relates to the field of communications technologies, and in particular, to a clock synchronization method, a receiver, a transmitter, and a clock synchronization system.

BACKGROUND

A circuit emulation service relates to a clock synchronization technology. The International Telecommunication Union Telecommunication Standardization Sector (ITU-T) 1.363.1 standard defines a synchronous residual time stamp (SRTS) method for implementing differential clock synchronization. In the SRTS method, a transmitter sends information about a frequency offset between a service clock and a common reference clock to a receiver using a residual time stamp (RTS) packet. The receiver performs clock recovery according to the frequency offset information in the received RTS packet.

However, when the receiver does not receive the RTS packet sent by the transmitter, an offset may occur on a phase, relative to a phase of a service clock signal of the transmitter, of a service clock signal generated by the receiver.

SUMMARY

Embodiments of the present disclosure provide a clock synchronization method, a receiver, a transmitter, and a clock synchronization system such that when the receiver does not receive an RTS packet sent by the transmitter, an offset of a phase, relative to a phase of a service clock signal of the transmitter, of a service clock signal generated by the receiver decreases.

According to a first aspect, a clock synchronization method is disclosed, where the method is executed by a receiver and includes obtaining a common reference clock signal, where a frequency of the common reference clock signal is $f_n$, determining $B_t$ according to the common reference clock signal and $Mr_d(t-1)$, where $$B_t = \mathrm{mod}\left[\sum_{n=0}^{t-1} Mr_d(n), 2^P\right],$$

t is a positive integer, and $Mr_d(0)$ is an initial value, when $C_t$ obtained by means of calculation according to $Mr_d(t-1)$ is less than or equal to a threshold, determining that $Mr_d(t-1)$ is a target $Mr_d$, where $C_t = B_t - A_t$, $A_t$ is included in an RTS packet that is sent by a transmitter and that is received by the receiver last time, and $$A_t = \mathrm{mod}\left[\sum_{n=0}^{t} M_d(n), 2^P\right],$$

$M_d(n)$ is frequency offset information, and $M_d(n)=M_q(n)-M_{nom}$, $M_q(n)$ is a quantity, determined by the transmitter within an $n^{th}$ RTS period, of rising edges of the common reference clock signal, $M_{nom}$ is a reference quantity, obtained by the transmitter, of clock periods of the common reference clock signal within the $n^{th}$ RTS period, P is a bit width of a counter in the transmitter, the counter in the transmitter is configured to record the quantity, in the transmitter within the $n^{th}$ RTS period, of rising edges of the common reference clock signal, and n is a positive integer, performing frequency division on the common reference clock signal using the target $Mr_d$ as a frequency dividing coefficient to obtain a first clock signal, where a frequency of the first clock signal is $\overline{f_{sN}}$, and performing frequency multiplication processing on the first clock signal to obtain a service clock signal, where a frequency of the service clock signal is $\overline{f_s}$, $\overline{f_s}=\overline{f_{sN}} \times N$, and N is a multiplication factor.

With reference to the first aspect, in a first possible implementation manner of the first aspect, determining $B_t$ according to the common reference clock signal and $Mr_d(t-1)$ includes performing frequency division on the common reference clock signal using $Mr_d(t-1)$ as a frequency dividing coefficient to obtain a second clock signal, where a frequency of the second clock signal is $\overline{f_{sN(t-1)}}$, and a period of the second clock signal is $\overline{T_{(t-1)}}$, performing summation on $Mr_d$ using a formula $B_t=B_{t-1}+Mr_d(t-1)$, and storing $B_t$ obtained after the summation into a counter in the receiver when the period $T_{(t-1)}$ of the second clock signal starts, and obtaining a new $\overline{B_t}$ by means of calculation using a formula $\overline{B_t}=B_t-2^P$ when $B_t > 2^P$.

With reference to the first aspect, or the first possible implementation manner of the first aspect, in a second possible implementation manner of the first aspect, when t is greater than 1, $Mr_d(t-1)$ is $Mr_d(t-2)$.

With reference to the first possible implementation manner of the first aspect, in a third possible implementation manner of the first aspect, the method further includes generating a new $Mr_d$ according to a value of $Mr_d(t-1)$ when $C_t$ obtained by means of calculation according to $Mr_d(t-1)$ is greater than the threshold, recalculating $B_t$ according to the new $Mr_d$ and the common reference clock signal, recalculating $C_t$ according to $B_t$ that is obtained after the recalculation, and determining that the new $Mr_d$ is the target $Mr_d$ when $C_t$ that is obtained after the recalculation is less than or equal to the threshold.

With reference to the third possible implementation manner of the first aspect, in a fourth possible implementation manner of the first aspect, the generating a new $Mr_d$ according to a value of $Mr_d(t-1)$ when $C_t$ obtained by means of calculation according to $Mr_d(t-1)$ is greater than the threshold includes performing transition detection filtering on $C_t$ to obtain a smooth $C_t$, performing loop filtering on the smooth $C_t$ to obtain an adjustment factor $\Delta M_{rd}$ used for adjusting the value of $Mr_d(t-1)$, and adjusting the value of $Mr_d(t-1)$ according to the adjustment factor $\Delta M_{rd}$ to obtain the new $Mr_d$.

With reference to any one of the first aspect, or the first to the fourth possible implementation manners of the first aspect, in a fifth possible implementation manner of the first aspect, the RTS packet further includes the bit width P of the counter in the transmitter, and/or the reference quantity $M_{nom}$, in the transmitter, of the common reference clock signal within the $n^{th}$ RTS period.

According to a second aspect, a clock synchronization method is disclosed, where the method is executed by a transmitter and includes obtaining a service clock signal, where a frequency of the service clock signal is $f_s$, dividing the frequency $f_s$ of the service clock signal by a factor N, and determining an RTS period T of sending an RTS packet by the transmitter, where $$T = \frac{N}{f_s},$$

and N is greater than 1, determining a quantity $M_q(n)$ of clock periods of a common reference clock signal within an $n^{th}$ RTS period T, where a frequency of the common reference clock signal is $f_n$, calculating information $M_d(n)$ about a frequency offset between the frequency $f_s$ of the service clock signal and the frequency $f_n$ of the common reference clock signal using a formula $M_d(n)=M_q(n)-M_{nom}$ and $M_q(n)$, where $M_{nom}$ is a reference quantity, obtained by the transmitter, of clock periods of the common reference clock signal within the $n^{th}$ RTS period T, and n is a positive integer, calculating $A_t$ using a formula $$A_t = \mathrm{mod}\left[\sum_{n=0}^{t} M_d(n), 2^P\right]$$

and according to the frequency offset information $M_d(n)$, where P is a bit width of a counter in the transmitter, and the counter in the transmitter is configured to record a quantity, in the transmitter within the $n^{th}$ RTS period, of rising edges of the common reference clock signal, and sending the RTS packet to a receiver, where the RTS packet includes $A_t$.

With reference to the second aspect, in a first possible implementation manner of the second aspect, the calculating $A_t$ using a formula $$A_t = \mathrm{mod}\left[\sum_{n=0}^{t} M_d(n), 2^P\right]$$

and according to the frequency offset information $M_d(t)$ includes performing summation on the frequency offset information $M_d(n)$ using a formula $A_t=A_{t-1}+M_d(t)$, and storing $A_t$ obtained after the summation into the counter in the transmitter, and when $A_t>2^P$, obtaining a new $\overline{A_t}$ by means of calculation using a formula $\overline{A_t}=A_t-2^P$.

According to a third aspect, a receiver is disclosed, including a first obtaining unit configured to obtain a common reference clock signal, where a frequency of the common reference clock signal is $f_n$, a first calculation unit configured to determine $B_t$ according to $Mr_d(t-1)$ and the common reference clock signal that is obtained by the first obtaining unit, where $$B_t = \mathrm{mod}\left[\sum_{n=0}^{t-1} Mr_d(n), 2^P\right],$$

t is a positive integer, and $Mr_d(0)$ is an initial value, a first determining unit configured to determine that $Mr_d(t-1)$ is a target $Mr_d$ when $C_t$ obtained by means of calculation according to $Mr_d(t-1)$ is less than or equal to a threshold, where $C_t=B_t-A_t$, $A_t$ is included in an RTS packet that is sent by a transmitter and that is received by the receiver last time, and $$A_t = \mathrm{mod}\left[\sum_{n=0}^{t} M_d(n), 2^P\right],$$

$M_d(n)$ is frequency offset information, and $M_d(n)=M_q(n)-M_{nom}$, $M_q(n)$ is a quantity, determined by the transmitter within an $n^{th}$ RTS period, of rising edges of the common reference clock signal, $M_{nom}$ is a reference quantity, obtained by the transmitter, of clock periods of the common reference clock signal within the $n^{th}$ RTS period, P is a bit width of a counter in the transmitter, the counter in the transmitter is configured to record the quantity, in the transmitter within the $n^{th}$ RTS period, of rising edges of the common reference clock signal, and n is a positive integer, a first frequency-division processing unit configured to perform frequency division on the common reference clock signal using the target $Mr_d$, which is determined by the first determining unit, as a frequency dividing coefficient to obtain a first clock signal, where a frequency of the first clock signal is $\overline{f_{sN}}$, and a clock-recovery processing unit configured to perform frequency multiplication processing on the first clock signal obtained by the first frequency-division processing unit to obtain a service clock signal, where a frequency of the service clock signal is $\overline{f_s}$, $\overline{f_s}=\overline{f_{sN}}\times N$, and N is a multiplication factor.

With reference to the third aspect, in a first possible implementation manner of the third aspect, the first calculation unit includes a frequency-division processing subunit configured to perform frequency division on the common reference clock signal using $Mr_d(t-1)$ as a frequency dividing coefficient to obtain a second clock signal, where a frequency of the second clock signal is $\overline{f_{sN(t-1)}}$, and a period of the second clock signal is $\overline{T_{(t-1)}}$, a first integral-calculation subunit configured to perform summation on $Mr_d$ using a formula $B_t=B_{t-1}+Mr_d(t-1)$, and store $B_t$ obtained after the summation into a counter in the receiver when the period $\overline{T_{(t-1)}}$ of the second clock signal obtained by the frequency-division processing subunit starts, and a first numeric-value turnover subunit configured to obtain a new $\overline{B_t}$ by means of calculation using a formula $\overline{B_t}=B_t-2^P$ when $B_t$ stored by the first integral-calculation subunit is greater than $2^P$.

With reference to the third aspect, or the first possible implementation manner of the third aspect, in a second possible implementation manner of the third aspect, when t is greater than 1, $Mr_d(t-1)$ is $Mr_d(t-2)$.

With reference to the first possible implementation manner of the third aspect, in a third possible implementation manner of the third aspect, the receiver further includes an adjustment unit configured to generate a new $Mr_d$ according to a value of $Mr_d(t-1)$ when $C_t$ obtained by means of calculation according to $Mr_d(t-1)$ is greater than the threshold, the first calculation unit is further configured to recalculate $B_t$ according to the new $Mr_d$ and the common reference clock signal, and recalculate $C_t$ according to $B_t$ that is obtained after the recalculation, until $C_t$ that is obtained after the recalculation is less than or equal to the threshold, and the first determining unit is further configured to determine that the new $Mr_d$ is the target $Mr_d$ when $C_t$ that is obtained after the recalculation by the first calculation unit is less than or equal to the threshold.

With reference to the third possible implementation manner of the third aspect, in a fourth possible implementation manner of the third aspect, the adjustment includes a transition detection subunit configured to perform transition detection filtering on $C_t$ to obtain a smooth $C_t$, a loop filtering subunit configured to perform loop filtering on the smooth $C_t$ obtained by the transition detection subunit to obtain an adjustment factor $\Delta M_{rd}$ used for adjusting the value of $Mr_d(t-1)$, and an adjustment subunit configured to adjust the value of $Mr_d(t-1)$ according to the adjustment factor $\Delta M_{rd}$ obtained by the loop filtering subunit to obtain the new $Mr_d$.

With reference to any one of the third aspect, or the first to the fourth possible implementation manners of the third aspect, in a fifth possible implementation manner of the third aspect, the RTS packet further includes the bit width P of the counter in the transmitter, and/or the reference quantity $M_{nom}$, in the transmitter, of the common reference clock signal within the $n^{th}$ RTS period.

According to a fourth aspect, a transmitter is disclosed, including a second obtaining unit configured to obtain a service clock signal, where a frequency of the service clock signal is $f_s$, a second frequency-division processing unit configured to divide the frequency $f_s$ of the service clock signal, obtained by the second obtaining unit, by a factor N, and determine an RTS period T of sending an RTS packet by the transmitter, where $$T = \frac{N}{f_s},$$

and N is greater than 1, a second determining unit configured to determine a quantity $M_q(n)$ of clock periods of a common reference clock signal within an $n^{th}$ RTS period T determined by the second frequency-division processing unit, where a frequency of the common reference clock signal is $f_n$, a second calculation unit configured to calculate information $M_d(n)$ about a frequency offset between the frequency $f_s$ of the service clock signal and the frequency $f_n$ of the common reference clock signal using a formula $M_d(n)=M_q(n)-M_{nom}$ and $M_q(n)$ that is determined by the second determining unit, where $M_{nom}$ is a reference quantity, obtained by the transmitter, of clock periods of the common reference clock signal within the $n^{th}$ RTS period T, and n is a positive integer, a third calculation unit configured to calculate $A_t$ using a formula $$A_t = \mathrm{mod}\left[\sum_{n=0}^{t} M_d(n), 2^P\right]$$

and according to the frequency offset information $M_d(n)$ calculated by the second calculation unit, where P is a bit width of a counter in the transmitter, and the counter in the transmitter is configured to record a quantity, in the transmitter within the $n^{th}$ RTS period, of rising edges of the common reference clock signal, and a sending unit configured to send the RTS packet to a receiver, where the RTS packet includes $A_t$ calculated by the third calculation unit.

With reference to the fourth aspect, in a first possible implementation manner of the fourth aspect, the third calculation unit includes a second integral-calculation subunit configured to perform summation on the frequency offset information $M_d(n)$ using a formula $A_t=A_{t-1}+M_d(t)$, and store $A_t$ obtained after the summation into the counter in the transmitter, and a second numeric-value turnover subunit configured to when $A_t$ obtained by the second integral-calculation subunit is greater than $2^P$, obtain a new $\overline{A_t}$ by means of calculation using a formula $\overline{A_t}=A_t-2^P$.

According to a fifth aspect, a clock synchronization system is disclosed, including the transmitter according to the fourth aspect or the first possible implementation manner of the fourth aspect, and the receiver according to any one of the third aspect to the fifth possible implementation manner of the third aspect.

It may be learnt from the foregoing technical solutions that, a transmitter calculates $A_t$ using a formula $$A_t = \mathrm{mod}\left[\sum_{n=0}^{t} M_d(n), 2^P\right]$$

and according to information $M_d(n)$, obtained by means of calculation, about a frequency offset between a frequency $f_s$ of a service clock signal and a frequency $f_n$ of a common reference clock signal, and sends an RTS packet that includes $A_t$ to a receiver. Therefore, the transmitter implements summation processing on multiple pieces of generated frequency offset information $M_d(n)$, that is, the transmitter implements integral processing on $M_d(n)$. In terms of the receiver, after obtaining the common reference clock signal, the receiver determines $B_t$ according to the common reference clock signal and $Mr_d(t-1)$, where $$B_t = \mathrm{mod}\left[\sum_{n=0}^{t-1} Mr_d(n), 2^P\right].$$

When determining that $C_t$ obtained by means of calculation according to $Mr_d(t-1)$ is less than or equal to a threshold, the receiver determines that $Mr_d(t-1)$ is a target $Mr_d$, where $C_t=B_t-A_t$. The receiver performs frequency division on the common reference clock signal using the target $Mr_d$ as a frequency dividing coefficient, to obtain a first clock signal. A frequency of the first clock signal is $\overline{f_{sN}}$. The receiver performs frequency multiplication processing on the first clock signal, to obtain a service clock signal. The frequency of the service clock signal is $\overline{f_s}=\overline{f_{sN}} \times N$. N is a multiplication factor. It is assumed that the transmitter sends three RTS packets to the receiver in three consecutive RTS periods. Further, the transmitter sends a packet 1 within an RTS period 1, sends a packet 2 within an RTS period 2, and sends a packet 3 within an RTS period 3. The RTS period 1 is the last RTS period of the RTS period 2, and the RTS period 2 is the last RTS period of the RTS period 3. The receiver receives the packets 1 and 3, but does not receive the packet 2. When the receiver does not receive the RTS packet 2 sent by the transmitter, the receiver calculates the frequency $\overline{f_{sN}}$ of the clock signal according to $Mr_d(t-1)$. $Mr_d(t-1)$ is obtained by the transmitter by means of calculation according to $A_{t-1}$ carried in the packet 1. The receiver calculates the frequency $\overline{f_{sN}}$ of the clock signal according to $Mr_d(t-1)$, and determines that, relative to a phase of a service clock signal when the transmitter sends the RTS packet 2, an offset occurs on a phase of the service clock signal generated according to the calculated frequency $\overline{f_{sN}}$ of the clock signal. When the receiver calculates the frequency $\overline{f_{sN}}$ of the clock signal according to $A_{t+1}$ carried in the packet 3, the received $A_{t+1}$ is equal to the sum of the multiple pieces of frequency offset information $M_d(n)$ generated by the transmitter. Although the receiver does not receive the RTS packet 2, $A_{t+1}$ received by the receiver is equal to the sum of the multiple pieces of frequency offset information $M_d(n)$ generated by the transmitter. The multiple pieces of frequency offset information $M_d(n)$ include frequency offset information generated when the transmitter sends the RTS packet 2. After obtaining $A_{t+1}$ in the packet 3, the receiver calculates $Mr_d(t+1)$ according to $A_{t+1}$. The receiver may alternatively recalculate $Mr_d(t+1)$ according to $A_{t+1}$ in order to enable the difference $C_t$ between $A_t$ and $B_t$ to be less than or equal to the threshold. When the difference $C_t$ between $A_t$ and $B_t$ is less than or equal to the threshold, the phase of the service clock signal generated according to $Mr_d(t+1)$ is consistent with a phase of a service clock signal when the transmitter sends the packet 3, and no phase offset occurs.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description merely show some embodiments of the present disclosure, and a person of ordinary skill in the art can derive other drawings from these accompanying drawings without creative efforts.

DESCRIPTION OF EMBODIMENTS

Figure 1:
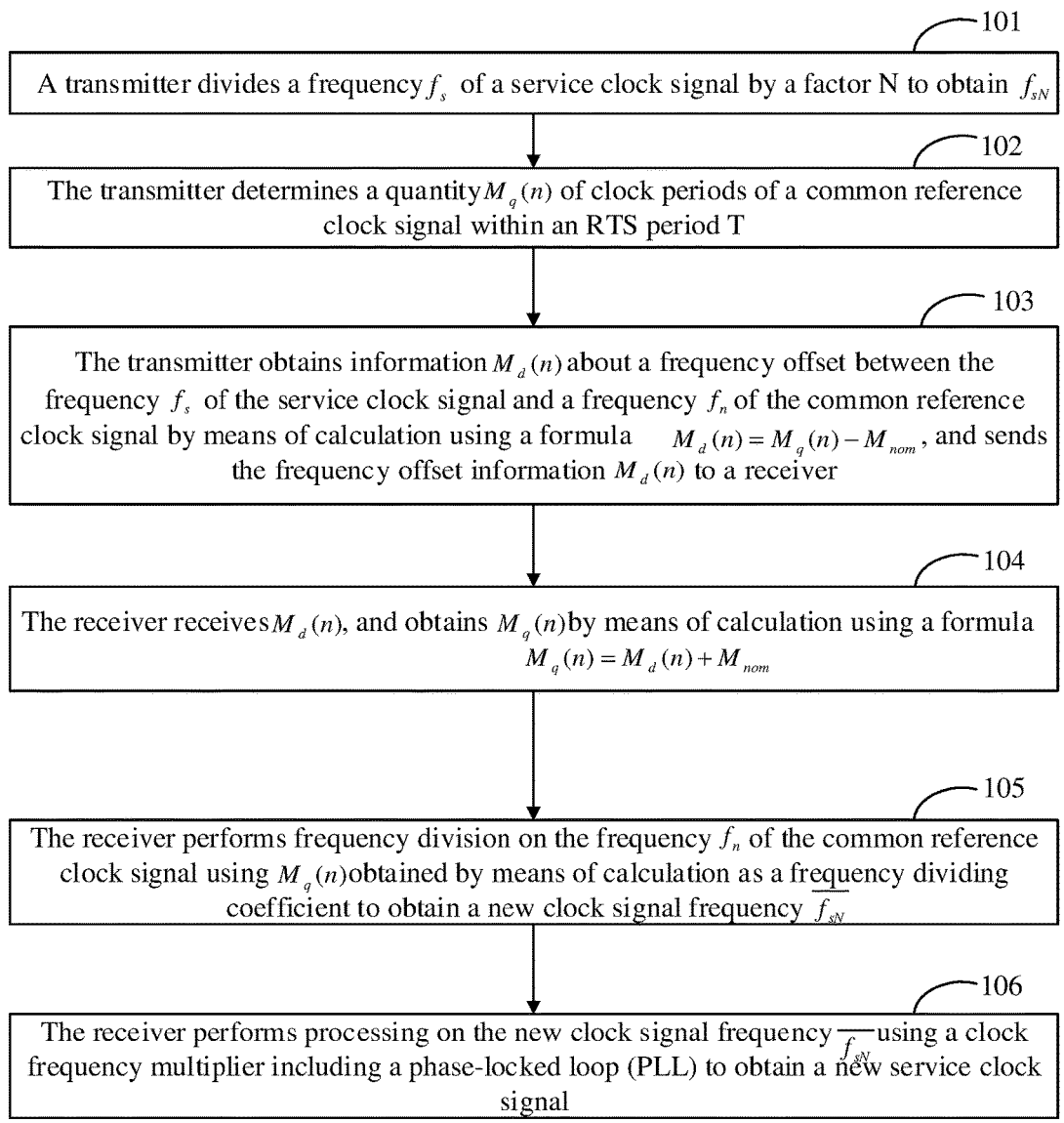
FIG. 1 is a schematic flowchart of a clock synchronization method according to an embodiment.

The following clearly describes the technical solutions in the embodiments of the present disclosure with reference to the accompanying drawings in the embodiments of the present disclosure. The described embodiments are merely some but not all of the embodiments of the present disclosure.

Before specific descriptions of the embodiments, related parameter information involved in the application file is first described briefly.

A transmitter involved in this application refers to a transmitter defined in ITU-T 1.363.1. A receiver involved in this application refers to a receiver defined in ITU-T 1.363.1.

A phase offset in this application refers to an offset of a phase, relative to a phase of a service clock signal of a transmitter, of a service clock signal generated by a receiver.

Dividing a frequency of a service clock signal by a factor N that is mentioned in this application refers to performing frequency division on the frequency of the service clock signal, where a frequency dividing coefficient is N.

A packet loss mentioned in this application indicates that a receiver does not receive an RTS packet sent by a transmitter.

For an RTS period mentioned in this application, reference may be made to ITU-T 1.363.1.

An $n^{th}$ RTS period mentioned in this application refers to the $n^{th}$ RTS period with specified chronological order, where n is a positive integer. For example, the second RTS period refers to an RTS period that is adjacent to the first RTS period and that is after the first RTS period. The third RTS period refers to an RTS period that is adjacent to the second RTS period and that is after the first RTS period and the second RTS period.

For example, a quantity, determined by a transmitter within the $n^{th}$ RTS period, of rising edges of a common reference clock signal refers to a quantity, within the $n^{th}$ RTS period, of detected rising edges of the common reference clock signal.

$f_s$ is a frequency of a service clock signal, $f_n$ is a frequency of a common reference clock signal, for example, 155.52 megahertz (MHz), N is a quantity of periods, included in an RTS period T, of the service clock signal, T is an RTS period, or may be referred to as a sending period of an RTS, where $$T = \frac{N}{f_s},$$

in M ($M_{min}$, $M_{nom}$, $M_{max}$), $M_{min}$, $M_{nom}$, and $M_{max}$ are respectively a minimum quantity, a reference quantity, and a maximum quantity of clock periods of the common reference clock signal within the RTS period T, and meet the following condition $$M = \frac{f_n}{\left(\frac{f_s}{N}\right)} = f_n T,$$

$M_q(n)$ is a maximum integer less than or equal to M, $M_d(n)$ is a difference between $M_q(n)$ and $M_{nom}$, that is, $M_d(n)=M_q(n)-M_{nom}$, $A_t$ is a result obtained after a transmitter performs, using the RTS period T as a period, summation on $M_d(n)$ resulting from each calculation, and a bit width of a counter in the transmitter is a P-bit width, $Mr_d(n)$ is frequency offset information of a receiver and meets $$\frac{f_n}{M_{rd} + M_{nom}} = \frac{f_s}{N},$$

where $Mr_d(0)$ is an initial value, $B_t$ is a result obtained after the receiver performs, using a clock signal period T corresponding to a clock signal frequency $\overline{f_{sN}}$ obtained by means of calculation as a period, summation on all obtained $Mr_d(n)$, and a bit width of a counter in the receiver is a P-bit width, and $C_t$ is a difference between $A_t$ and $B_t$, that is, $C_t = B_t - A_t$.

An embodiment provides a clock synchronization method. Referring to FIG. 1, the clock synchronization method includes the following steps.

Step 101: A transmitter obtains a service clock signal, where a frequency of the service clock signal is $f_s$, and divides the frequency $f_s$ by a factor N to obtain $$f_{sN} = \frac{f_s}{N}.$$

N is a quantity of clock periods of the service clock signal within an RTS period T (the RTS period T may be alternatively referred to as a sending period T of an RTS), where N is greater than 1, and the RTS period is $$T = \frac{1}{f_{sN}}.$$

Step 102: The transmitter determines a quantity $M_q(n)$ of clock periods of a common reference clock signal within an RTS period T.

Further, $M_q(n)$ is a quantity, determined by the transmitter within an $n^{th}$ RTS period T, of rising edges of the common reference clock signal.

Step 103: The transmitter obtains information $M_d(n)$ about a frequency offset between the frequency $f_s$ of the service clock signal and a frequency $f_n$ of the common reference clock signal by means of calculation using a formula $M_d(n) = M_q(n) - M_{nom}$, and sends the frequency offset information $M_d(n)$ to a receiver.

$M_{nom}$ is a reference quantity of clock periods of the common reference clock signal within the RTS period T, and the value has a specified association relationship with N and can be set according to actual needs.

Step 104: The receiver receives $M_d(n)$, and obtains $M_q(n)$ by means of calculation using a formula $M_q(n) = M_d(n) + M_{nom}$.

Step 105: The receiver performs frequency division on the frequency $f_n$ of the common reference clock signal using $M_q(n)$ obtained by means of calculation as a frequency dividing coefficient, to obtain a new clock signal frequency $\overline{f_{sN}}$.

Further, $$\overline{f_{sN}} = \frac{f_n}{M_q(n)}.$$

In this case, $\overline{f_{sN}}$ obtained by the receiver approximates to $f_{sN}$.

Step 106: The receiver performs processing on the new clock signal frequency $\overline{f_{sN}}$ using a clock frequency multiplier including a phase-locked loop (PLL) to obtain a new service clock signal, where a frequency of the new service clock signal is $\overline{f_s} = N \times \overline{f_{sN}}$, and N is a multiplication factor of the clock frequency multiplier.

Figure 2:
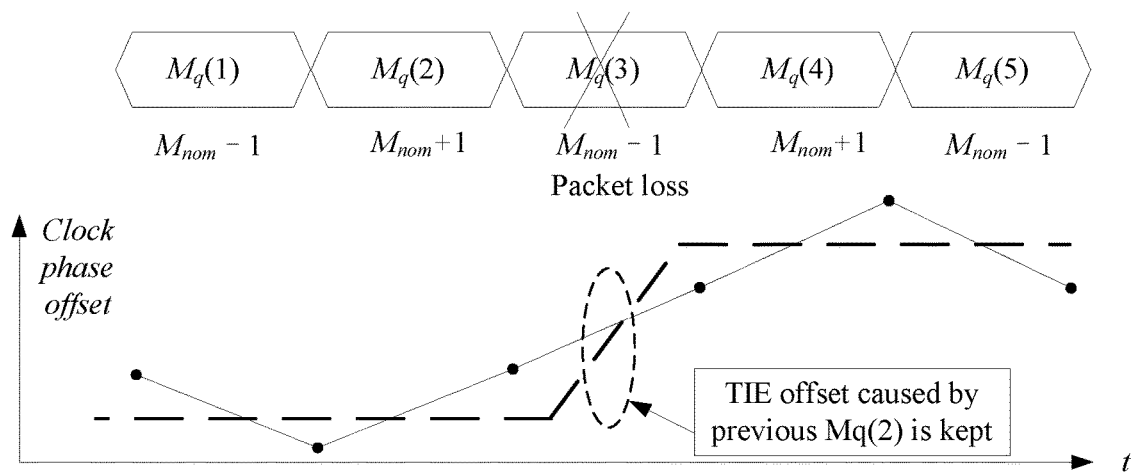
FIG. 2 is a schematic diagram of a phase offset when a packet loss occurs in a clock synchronization method according to an embodiment.

In the foregoing clock synchronization method, when a packet loss occurs due to network congestion, an RTS packet sent by a transmitter may be lost. A receiver cannot obtain a frequency offset $M_d(n)$ in the lost RTS packet to obtain $M_q(n)$ by means of calculation. In this case, the receiver generates a service clock signal this time using a frequency offset $M_q(n-1)$ calculated last time. However, the frequency offset $M_q(n-1)$ calculated last time may be inconsistent with $M_q(n)$ actually required this time. $M_q(n)$ actually required this time refers to $M_q(n)$ obtained by means of calculation according to the frequency offset information $M_d(n)$ in the lost RTS packet. When the frequency offset $M_q(n-1)$ calculated last time is inconsistent with $M_q(n)$ actually required this time, if the frequency offset $M_q(n-1)$ calculated last time is used to generate the service clock signal this time, an offset occurs on a phase of the newly generated service clock signal relative to a phase of a service clock signal of the transmitter. As shown in FIG. 2, a dashed line in FIG. 2 represents a phase offset status of a service clock signal of a receiver side, and a solid line represents a change status of a value of $M_q(n)$. It may be learnt that the value of $M_q(n)$ is characterized by periodic jitter, that is, periodic jitter of $M_q(n) = M_{nom} + 1$ and $M_q(n) = M_{nom} - 1$. A phase offset of a service clock signal also changes periodically. It is assumed that, when an RTS packet corresponding to $M_q(3)$ is lost, a phase of a service clock signal generated by the receiver using a value of $M_q(2)$ deviates upwards a lot, relative to a phase of a service clock signal generated by the receiver using a value of $M_q(3)$. The phase of the service clock signal generated by the receiver using the value of $M_q(3)$ is equal to the phase of the service clock signal of the transmitter. When multiple RTS packet losses occur, an offset obviously occurs on a phase of a service clock signal generated by the receiver.

Based on the foregoing, an embodiment of the present disclosure provides a clock synchronization method such that when a receiver does not receive an RTS packet sent by a transmitter in the foregoing technology, an offset of a phase, relative to a phase of a service clock signal of a transmitter side, of a service clock signal generated by the receiver decreases. Further, an embodiment of the present disclosure provides a clock synchronization system, including a receiver and a transmitter.

Figure 3:
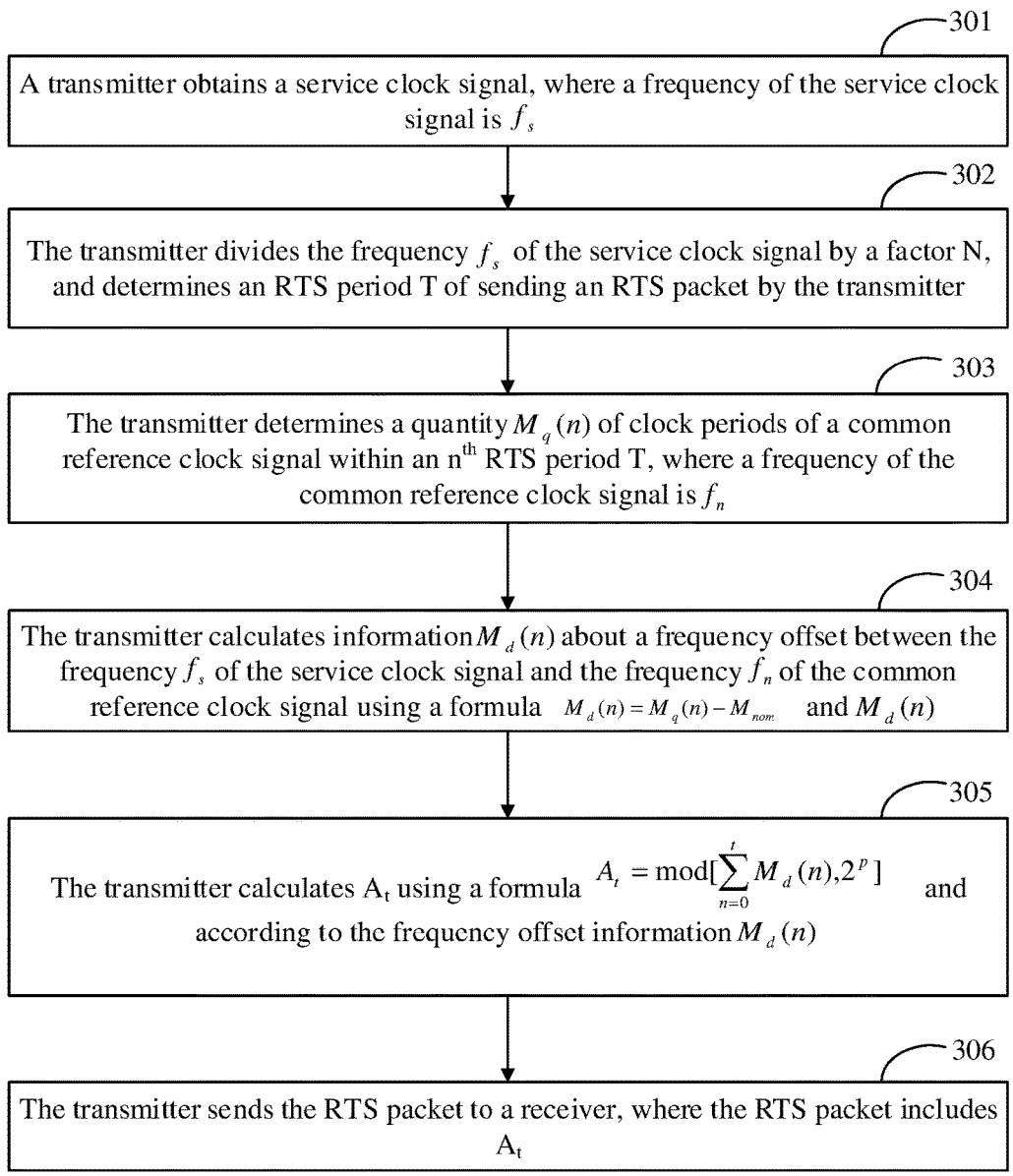
FIG. 3 is a schematic flowchart of a clock synchronization method according to an embodiment.

For ease of description, a method executed by the transmitter is described first. As shown in FIG. 3, the method includes the following steps.

Step 301: The transmitter obtains a service clock signal, where a frequency of the service clock signal is $f_s$.

Step 302: The transmitter divides the frequency $f_s$ of the service clock signal by a factor N, and determines an RTS period T of sending an RTS packet by the transmitter.

The transmitter divides the frequency $f_s$ of the service clock signal by a factor N, to obtain $f_{sN}$, where $$f_{sN} = \frac{f_s}{N}.$$

The RTS period is $$T = \frac{1}{f_{sN}},$$

and therefore, $$T = \frac{N}{f_s},$$

where N is greater than 1.

Preferably, a value of N is a corresponding value when a value of $f_{sN}$ is equal to $8 \times 10^3$ hertz (Hz) during calculation of the value $$f_{sN} = \frac{f_s}{N}.$$

Step 303: The transmitter determines a quantity $M_q(n)$ of clock periods of a common reference clock signal within an $n^{th}$ RTS period T, where a frequency of the common reference clock signal is $f_n$.

Further, within the $n^{th}$ RTS period T, each time the transmitter detects a rising edge of the common reference clock signal, counting is performed such that counting is performed on the frequency $f_n$ of the received common reference clock signal. Further, the transmitter stores a result that is obtained by means of counting within the $n^{th}$ RTS period T, and obtains the quantity $M_q(n)$ of clock periods of the common reference clock signal within the $n^{th}$ RTS period T.

When a rising edge of the frequency $f_n$ of the common reference clock signal is detected once, counting may be performed on the frequency $f_n$ of the common reference clock signal once using a P-bit counter, that is, 1 is added to a numeric value of the P-bit counter.

Step 304: The transmitter calculates information $M_d(n)$ about a frequency offset between the frequency $f_s$ of the service clock signal and the frequency $f_n$ of the common reference clock signal using a formula $M_d(n)=M_q(n)-M_{nom}$ and $M_q(n)$.

$M_{nom}$ is a reference quantity, obtained by the transmitter, of clock periods of the common reference clock signal within the $n^{th}$ RTS period T, where n is a positive integer.

Step 305: The transmitter calculates $A_t$ using a formula $$A_t = \operatorname{mod}\left[\sum_{n=0}^{t} M_d(n), 2^P\right]$$

and according to the frequency offset information $M_d(n)$.

P is a bit width of the counter in the transmitter and may be in a binary, decimal, or hexadecimal system, the counter in the transmitter is configured to record a quantity, in the transmitter within the $n^{th}$ RTS period T, of rising edges of the common reference clock signal.

Further, the transmitter performs summation on the frequency offset information $M_d(n)$ using a formula $A_t=A_{t-1}+M_d(t)$, and stores $A_t$ obtained after the summation to the P-bit counter. For example, when the transmitter obtains frequency offset information $M_{d1}$ for the first time, $A_t=M_{d1}$. When the transmitter obtains frequency offset information $M_{d2}$ for the second time, $A_2=A_1+M_{d2}$, that is, $A_2=M_{d1}+M_{d2}$. When the transmitter obtains frequency offset information $M_{d3}$ for the third time, $A_3=A_2+M_{d3}$, that is, $A_3=M_{d1}+M_{d2}+M_{d3}$. By analogy, when the transmitter obtains frequency offset information $M_{dn}$ for the $n^{th}$ time, $A_t=M_{d1}+M_{d2}+\ldots+M_{dn}$.

When $A_t>2^P$, numeric-value turnover is performed on $A_t$ using a formula $\overline{A_t}=A_t-2^P$, to obtain a new $\overline{A_t}$ by means of calculation.

Step 306: The transmitter sends the RTS packet to a receiver, where the RTS packet includes $A_t$.

In the foregoing technical solutions, instead of sending frequency offset information $M_d(n)$ that is separately obtained by means of calculation within each RTS period T to a receiver, a transmitter performs summation and turnover processing on multiple pieces of frequency offset information $M_d(n)$ that are respectively corresponding to multiple consecutive RTS periods T to obtain $A_t$, and then sends $A_t$ to the receiver. $A_t$ is related to the sum of the multiple pieces of frequency offset information $M_d(n)$ generated by the transmitter.

Figure 4:
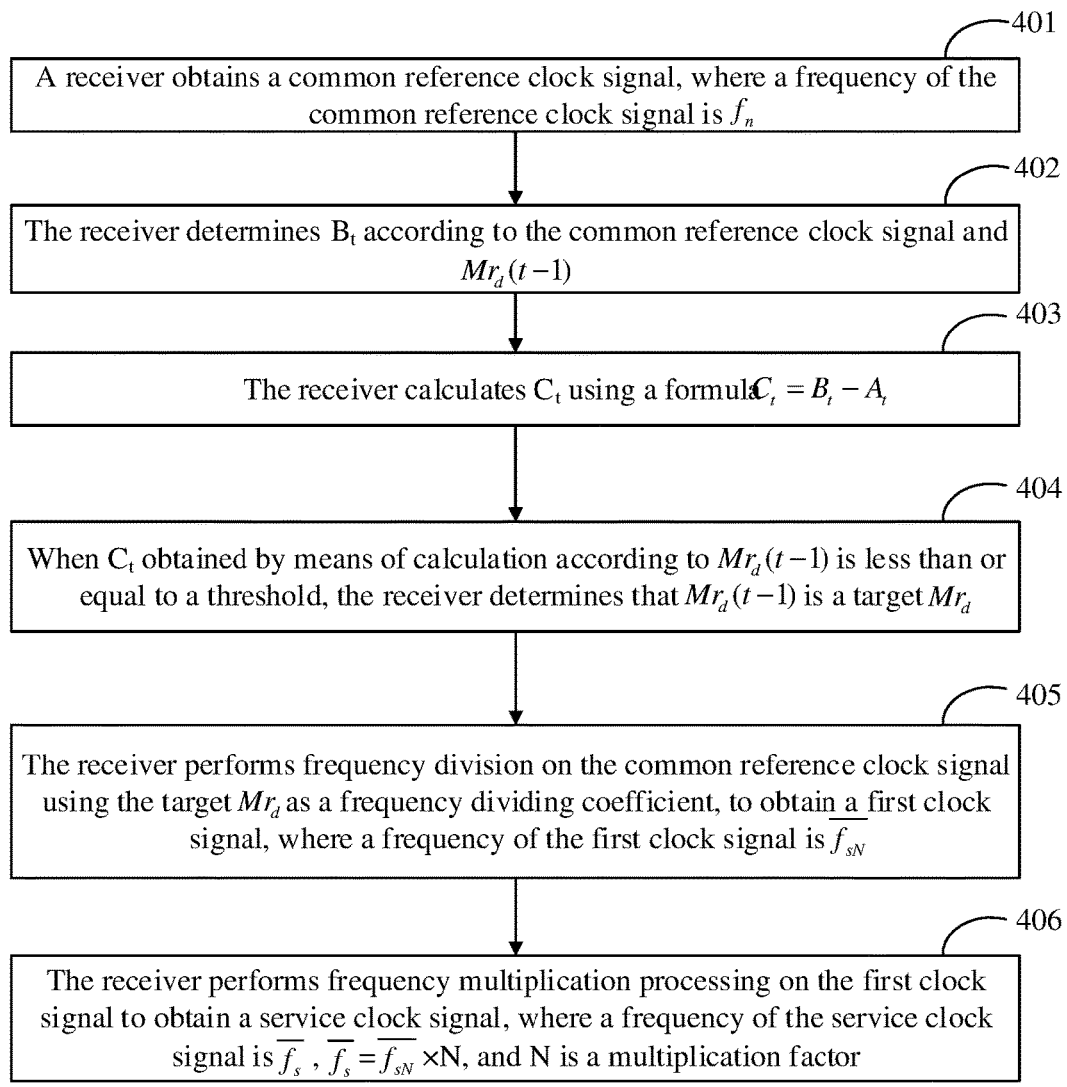
FIG. 4 is a schematic flowchart of a clock synchronization method according to an embodiment.

As described above, an embodiment of the present disclosure provides a clock synchronization system, including a receiver and a transmitter. FIG. 4 is a schematic diagram of a method executed by the receiver. It may be understood that the clock synchronization system is described in FIG. 3 and FIG. 4 from different perspectives. The clock synchronization system is implemented by means of interaction between the transmitter and the receiver. Therefore, for understanding of the method shown in FIG. 3, reference may be made to the method shown in FIG. 4 and a description of an embodiment corresponding to FIG. 4. For understanding of the method shown in FIG. 4, reference may be made to the method shown in FIG. 3 and a description of the embodiment corresponding to FIG. 3. Referring to FIG. 4, the method executed by the receiver includes the following steps.

Step 401: The receiver obtains a common reference clock signal, where a frequency of the common reference clock signal is $f_n$.

Step 402: The receiver determines $B_t$ according to the common reference clock signal and $Mr_d(t-1)$.

$$B_t = \operatorname{mod}\left[\sum_{n=0}^{t-1} Mr_d(n), 2^P\right],$$

is a positive integer, and $Mr_d(0)$ is an initial value preset by the receiver side.

During specific implementation of the foregoing technical solutions, the receiver presets the initial $Mr_d(0)$, the numeric value of $Mr_d(0)$ is a numeric value first assigned by a user according to experience. When calculating $B_1$ for the first time, the receiver first uses $Mr_d(0)$ to perform calculation. Subsequently, when calculating $B_2$ for the second time, the receiver performs calculation according to $Mr_d(1)$ that is determined by means of calculation for the first time. When calculating $B_3$ for the third time, the receiver performs calculation according to $Mr_d(2)$ that is determined by means of calculation for the second time. By analogy, when calculating $B_t$ for the $t^{th}$ time, the receiver performs calculation according to $Mr_d(t-1)$ that is determined by means of calculation for the $(t-1)^{th}$ time.

The following further details the method, in step 402, of obtaining $B_t$ by means of calculation, where the method includes the following steps.

Step 4021: The receiver performs frequency division on the common reference clock signal using $Mr_d(t-1)$ as a frequency dividing coefficient to obtain a second clock signal, where a frequency of the second clock signal is $\overline{f_{sN(t-1)}}$, and a period of the second clock signal is $\overline{T_{(t-1)}}$.

In this embodiment, when calculating $B_1$ for the first time, the receiver first uses $Mr_d(0)$ as a frequency dividing coefficient to perform frequency division on the frequency $f_n$ of the common reference clock signal. In this case, a frequency $\overline{f_{sN(0)}}$ and a period $\overline{T_{(0)}}$ of the second clock signal are obtained.

When calculating $B_2$ for the second time, the receiver uses $Mr_d(1)$, which is determined after $B_1$ is calculated for the first time, as a frequency dividing coefficient to perform frequency division on the frequency $f_n$ of the common reference clock signal. In this case, a frequency $\overline{f_{sN(1)}}$ and a period $\overline{T_{(1)}}$ of the second clock signal are obtained.

By analogy, when calculating $B_t$ for the $t^{th}$ time, the receiver uses $Mr_d(t-1)$, which is determined after $B_{t-1}$ is calculated for the $(t-1)^{th}$ time, as a frequency dividing coefficient to perform frequency division on the frequency $f_n$ of the common reference clock signal. In this case, a frequency $\overline{f_{sN(t-1)}}$ and a period $\overline{T_{(t-1)}}$ of the second clock signal are obtained.

Step 4022: When the period $\overline{T_{(t-1)}}$ of the second clock signal starts, the receiver performs summation on $Mr_d$ using a formula $B_t=B_{t-1}+Mr_d(t-1)$, and store $B_t$ obtained after the summation into a counter in the receiver.

Further, when the first period $\overline{T_{(0)}}$ of the second clock signal starts, the receiver calculates $B_1$. In this case, $B_1=B_0+Mr_d(0)$. It should be noted that $B_0=0$.

When the second period $\overline{T_{(1)}}$ of the second clock signal starts, the receiver calculates $B_2$. In this case, $B_2=B_1+Mr_d(1)$, that is, $B_2=Mr_d(0)+Mr_d(1)$.

When the third period $\overline{T_{(2)}}$ of the second clock signal starts, the receiver calculates $B_3$. In this case, $B_3=B_2+Mr_d(2)$, that is, $B_3=Mr_d(0)+Mr_d(1)+Mr_d(2)$.

By analogy, when the $t^{th}$ period $\overline{T_{(t-1)}}$ of the second clock signal starts, the receiver calculates $B_t$. In this case, $B_t=B_t+Mr_d(t-1)$, that is, $B_t=Mr_d(0)+Mr_d(1)+Mr_d(2)+\ldots+Mr_d(t-1)$.

Step 4023: When $B_t>2^P$, perform numeric-value turnover on $B_t$ using a formula $\overline{B_t}=B_t-2^P$, to obtain a new $\overline{B_t}$ by means of calculation.

Therefore, after $B_t$ is obtained by means of calculation, $B_t$ is subsequently used for calculating $C_t$ in step 403.

Figure 5:
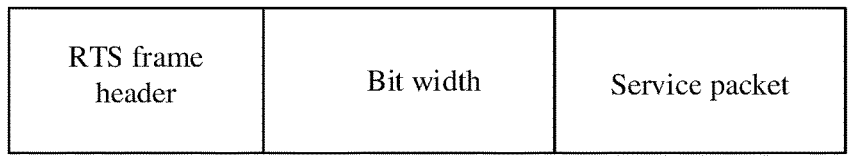
FIG. 5 is a schematic structural diagram of an RTS packet according to an embodiment.

It should be noted herein that the transmitter and the receiver use a same numeric-value turnover processing manner, and therefore, the transmitter and the receiver need to construct a same turnover counter (a P-bit counter). Therefore, the transmitter and the receiver may preset a same P-bit counter, or the transmitter may send a bit width of a P-bit counter in the transmitter to the receiver. The bit width of the P-bit counter in the transmitter may be carried in an RTS packet. More further, bit width information of the P-bit counter in the transmitter may be stored in a fixed location in an RTS frame header, as shown in FIG. 5.

Step 403: The receiver calculates $C_t$ using a formula $C_t=B_t-A_t$.

$A_t$ is included in an RTS packet that is sent by the transmitter and that is received by the receiver last time, and $$A_t = \mathrm{mod}\left[\sum_{n=0}^{t} M_d(n), 2^P\right],$$

$M_d(n)$ is frequency offset information, and $M_d(n)=M_q(n)-M_{nom}$, $M_q(n)$ is a quantity, determined by the transmitter within an $n^{th}$ RTS period, of rising edges of the common reference clock signal, $M_{nom}$ is a reference quantity, obtained by the transmitter, of clock periods of the common reference clock signal within the $n^{th}$ RTS period, P is a bit width of a counter in the transmitter, the counter in the transmitter is configured to record the quantity, in the transmitter within the $n^{th}$ RTS period, of rising edges of the common reference clock signal, and n is a positive integer.

In this embodiment, after obtaining $B_t$ by means of calculation, the receiver obtains $A_t$ from the RTS packet that is sent by the transmitter and that is receiver by the receiver last time, and then calculates $C_t$ using a formula $C_t=B_t-A_t$.

Step 404: When $C_t$ obtained by means of calculation according to $Mr_d(t-1)$ is less than or equal to a threshold, the receiver determines that $Mr_d(t-1)$ is a target $Mr_d$.

$A_t$ is the foregoing $A_t$ that is generated and sent by the transmitter, and $$A_t = \mathrm{mod}\left[\sum_{n=0}^{t} M_d(n), 2^P\right],$$

$M_d(n)$ is the frequency offset information, and $M_d(n)=M_q(n)-M_{nom}$, $M_q(n)$ is the quantity, determined by the transmitter within the $n^{th}$ RTS period, of rising edges of the common reference clock signal, $M_{nom}$ is the reference quantity, obtained by the transmitter, of clock periods of the common reference clock signal within the $n^{th}$ RTS period, P is the bit width of the counter in the transmitter, the counter in the transmitter is configured to record the quantity, in the transmitter within the $n^{th}$ RTS period, of rising edges of the common reference clock signal, and n is a positive integer.

Preferably, the threshold may be 0 or an extremely small numeric value.

Further, when $C_1$ that is obtained for the first time by means of calculation using $Mr_d(0)$ as a frequency diving coefficient is less than or equal to the threshold, the receiver determines that $Mr_d(0)$ is the target $Mr_d$. In this case, $Mr_d(1)$ is marked as the target $Mr_d$, that is, $Mr_d(1)=Mr_d(0)$.

When $C_2$ that is obtained for the second time by means of calculation using $Mr_d(1)$ as a frequency diving coefficient is less than or equal to the threshold, the receiver determines that $Mr_d(1)$ is the target $Mr_d$. In this case, $Mr_d(2)$ is marked as the target $Mr_d$, that is, $Mr_d(2)=Mr_d(1)$.

By analogy, when $C_t$ that is obtained for the $t^{th}$ time by means of calculation using $Mr_d(t-1)$ as a frequency diving coefficient is less than or equal to the threshold, the receiver determines that $Mr_d(t-1)$ is the target $Mr_d$. In this case, $Mr_d(t)$ is marked as the target $Mr_d$, that is, $Mr_d(t)=Mr_d(t-1)$.

In this embodiment, when $C_t$ that is obtained by the receiver by means of calculation according to $Mr_d(t-1)$ is less than or equal to the threshold, it indicates that $Mr_d(t-1)$ currently obtained is the target $Mr_d$ needed by the receiver. In this case, step 405 continues to be performed.

Step 405: The receiver performs frequency division on the common reference clock signal using the target $Mr_d$ as a frequency dividing coefficient, to obtain a first clock signal, where a frequency of the first clock signal is $\overline{f_{sN}}$.

In this embodiment, after performing frequency division on the frequency $f_n$ of the common reference clock signal using the target $Mr_d$ as the frequency dividing coefficient, the receiver obtains the frequency $\overline{f_{sN}}$ of the first clock signal and a period $\overline{T}$ of the first clock signal, where $$\overline{f_{sN}} = \frac{f_n}{M_{rd}+M_{nom}}, \text{ and } \overline{T} = \frac{1}{\overline{f_{sN}}}.$$

It should be specially noted that values of $M_{nom}$ that are set respectively by the transmitter and the receiver need to be consistent. Therefore, values of $M_{nom}$ may be respectively preset in the transmitter and the receiver. Alternatively, the transmitter may add $M_{nom}$ to the RTS packet, and then send the RTS packet to the receiver.

Step 406: The receiver performs frequency multiplication processing on the first clock signal to obtain a service clock signal, where a frequency of the service clock signal is $\overline{f_s}$, $\overline{f_s} = \overline{f_{sN}} \times N$, and N is a multiplication factor.

Further, the receiver may perform processing on the first clock signal using a clock frequency multiplier, where N is a multiplication factor of the clock frequency multiplier.

In this embodiment of the present disclosure, the receiver performs controlled frequency division on the frequency $f_n$ of the common reference clock signal using the target $Mr_d$, to obtain the frequency $\overline{f_{sN}}$ of the first clock signal, and further performs frequency multiplication processing on the first clock signal using the clock frequency multiplier, to obtain the service clock signal. The $\overline{f_{sN}}$ that is of the first clock signal and that is obtained by the receiver by performing controlled frequency division on the frequency $f_n$ of the common reference clock signal using the target $Mr_d$ is a clock signal frequency required by the receiver. The receiver may perform frequency multiplication processing on the frequency $\overline{f_{sN}}$ of the clock signal using the clock frequency multiplier including a PLL to obtain the service clock signal.

Therefore, in the foregoing embodiment, a transmitter calculates $A_t$ using a formula $$A_t = \mathrm{mod}\left[\sum_{n=0}^{t} M_d(n), 2^P\right]$$

and according to information $M_d(n)$, obtained by means of calculation, about a frequency offset between a frequency $f_s$ of a service clock signal and a frequency $f_n$ of a common reference clock signal, and sends an RTS packet that includes $A_t$ to a receiver. Therefore, the transmitter implements summation processing on multiple pieces of generated frequency offset information $M_d(n)$, that is, the transmitter implements integral processing on $M_d(n)$.

In terms of the receiver, after obtaining the common reference clock signal, the receiver determines $B_t$ according to the common reference clock signal and $Mr_d(t-1)$, where $$B_t = \mathrm{mod}\left[\sum_{n=0}^{t-1} Mr_d(n), 2^P\right].$$

When determining that $C_t$ obtained by means of calculation according to $Mr_d(t-1)$ is less than or equal to a threshold, the receiver determines that $Mr_d(t-1)$ is a target $Mr_d$, where $C_t = B_t - A_t$. Further, the receiver performs frequency division on the common reference clock signal using the target $Mr_d$ as a frequency dividing coefficient to obtain a first clock signal, where a frequency of the first clock signal is $\overline{f_{sN}}$. The receiver performs frequency multiplication processing on the first clock signal to obtain a service clock signal, where a frequency of the service clock signal is $\overline{f_{sN}} = \overline{f_s} \times N$, and N is a multiplication factor.

Figure 6:
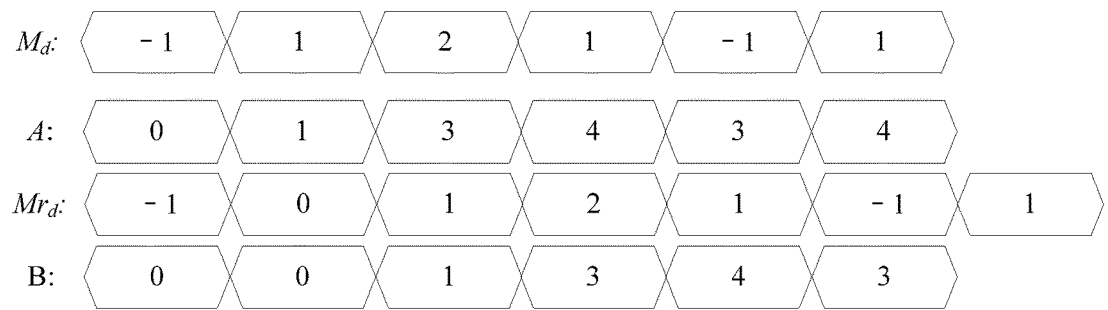
FIG. 6 is a schematic diagram of a change status of parameters, that is, $M_d(n)$ and $A_t$ of a transmitter, and $Mr_d(n)$ and $B_t$ of a receiver, when no packet loss occurs in a scenario provided in an embodiment.
Figure 7:
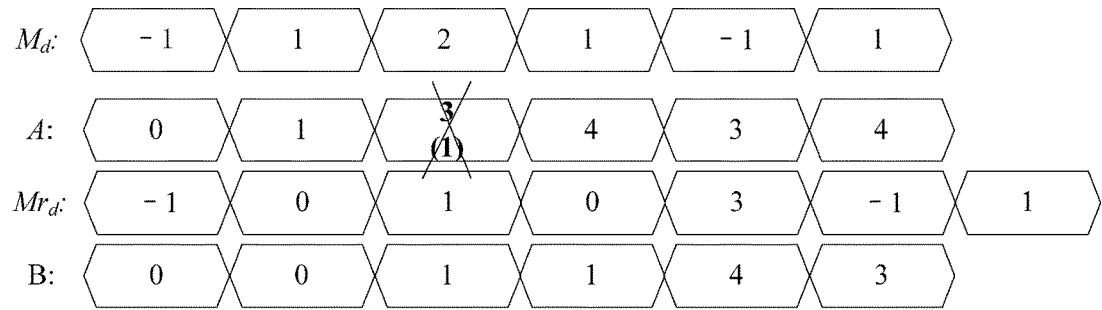
FIG. 7 is a schematic diagram of a change status of parameters, that is, $M_d(n)$ and $A_t$ of a transmitter, and $Mr_d(n)$ and $B_t$ of a receiver, when a packet loss occurs in a scenario provided in an embodiment.

Therefore, in the foregoing technical solutions, it is assumed that the transmitter sends three RTS packets to the receiver in three consecutive RTS periods T. Further, the transmitter sends a packet 1 within an RTS period $T_1$, sends a packet 2 within an RTS period $T_2$, and sends a packet 3 within an RTS period $T_3$. The RTS period $T_1$ is the last RTS period of the RTS period $T_2$, and the RTS period $T_2$ is the last RTS period of the RTS period $T_3$. The receiver receives the packets 1 and 3, but does not receive the packet 2. When the receiver does not receive the RTS packet 2 sent by the transmitter, the receiver calculates the frequency $\overline{f_{sN}}$ of the clock signal according to $Mr_d(t-1)$. $Mr_d(t-1)$ is obtained by the transmitter by means of calculation according to $A_{t-1}$ carried in the packet 1. The receiver calculates the frequency $\overline{f_{sN}}$ of the clock signal according to $Mr_d(t-1)$, and determines that, relative to a phase of a frequency of a service clock signal when the transmitter sends the RTS packet 2, an offset occurs on a phase of the service clock signal generated according to the calculated frequency $\overline{f_{sN}}$ of the clock signal. When the receiver calculates the frequency $\overline{f_{sN}}$ of the clock signal according to $A_{t+1}$ carried in the packet 3, the received $A_{t+1}$ is equal to the sum of the multiple pieces of frequency offset information $M_d(n)$ generated by the transmitter. Although the receiver does not receive the RTS packet 2, $A_{t+1}$ received by the receiver is equal to the sum of the multiple pieces of frequency offset information $M_d(n)$ generated by the transmitter. The multiple pieces of frequency offset information $M_d(n)$ include frequency offset information generated when the transmitter sends the RTS packet 2. After obtaining $A_{t+1}$ in the packet 3, the receiver calculates $Mr_d(t+1)$ according to $A_{t+1}$. The receiver may alternatively recalculate $Mr_d(t+1)$ according to $A_{t+1}$ in order to enable the difference $C_t$ between $A_t$ and $B_t$ to be less than or equal to the threshold. When the difference $C_t$ between $A_t$ and $B_t$ is less than or equal to the threshold, the phase of the service clock signal generated according to $Mr_d(t+1)$ is consistent with a phase of a service clock signal when the transmitter sends the packet 3, and no phase offset occurs. For details, reference may be made to FIG. 6 and FIG. 7. FIG. 6 shows a normal change status of parameters, that is, $M_d(n)$ and $A_t$ of a transmitter, and $Mr_d(n)$, and $B_t$ of a receiver, when no packet loss occurs, and FIG. 7 shows a change status of parameters, that is, $M_d(n)$ and $A_t$ of a transmitter, and $Mr_d(n)$ and $B_t$ of a receiver, when a packet loss occurs. Obviously, according to the clock synchronization method in the foregoing technical solutions, if a packet loss occurs, after a receiver receives a first RTS packet that includes the sum of multiple pieces of frequency offset information and that is sent by a transmitter, a phase of a service clock signal is promptly adjusted to be consistent with a phase of a service clock signal of the transmitter in order to avoid random phase offset.

In addition, based on the foregoing embodiment, preferably, the method may further include the following step (not shown).

Step 407: The receiver generates a new $Mr_d$ according to a value of $Mr_d(t-1)$ when $C_t$ obtained by means of calculation according to $Mr_d(t-1)$ is greater than the threshold, recalculates $B_t$ according to the new $Mr_d$ and the common reference clock signal, recalculates $C_t$ according to $B_t$ that is obtained after the recalculation, and when $C_t$ that is obtained after the recalculation is less than or equal to the threshold, determines that the new $Mr_d$ is the target $Mr_d$.

In this embodiment, when $C_t$ is greater than the threshold, it indicates that an offset exists in $Mr_d(t-1)$ selected currently. Adjustment needs to be performed on $Mr_d(t-1)$, to obtain the new $Mr_d$. A specific adjustment method includes the following steps.

Step 4071: Perform transition detection filtering on $C_t$ to obtain a smooth $C_t$.

Step 4072: Perform loop filtering on the smooth $C_t$ to obtain an adjustment factor $\Delta M_{rd}$ used for adjusting the value of $Mr_d(t-1)$.

Step 4073: Adjust the value of $Mr_d(t-1)$ according to the adjustment factor $\Delta M_{rd}$ to obtain the new $Mr_d$.

After the new $Mr_d$ is obtained, step 4021 is performed. The receiver performs frequency division on the frequency $f_n$ of the common reference clock signal using the new $Mr_d$ as a frequency dividing coefficient, to obtain a new second clock signal. Further, step 4021 to step 406 continue to be performed using a frequency and a period that are of the new second clock signal, and the new $Mr_d$.

In this embodiment, when a new $B_t$ that is obtained by means of calculation according to the new $Mr_d$ meets a condition that $C_t$ is less than or equal to the threshold, it is determined that the new $Mr_d$ is the target $Mr_d$.

Figure 8:
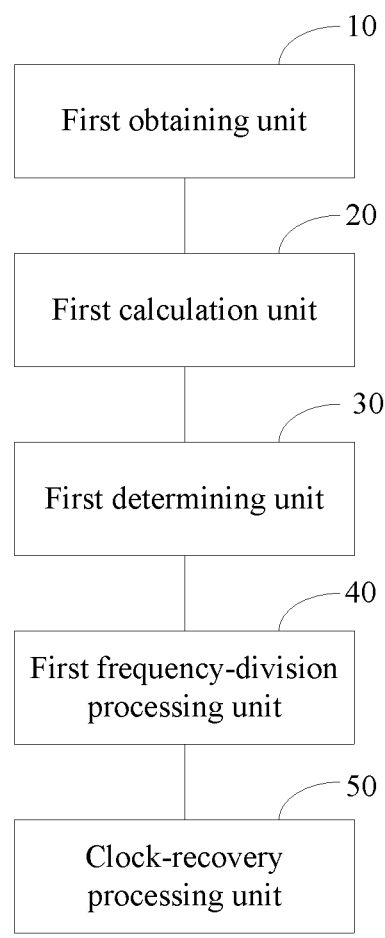
FIG. 8 is a schematic structural diagram of a receiver according to an embodiment of the present disclosure.

An embodiment further provides a receiver. The receiver may be configured to execute the method shown in FIG. 4. As shown in FIG. 8, the receiver includes a first obtaining unit 10 configured to obtain a common reference clock signal, where a frequency of the common reference clock signal is $f_n$, a first calculation unit 20 configured to determine Bt according to $Mr_d(t-1)$ and the common reference clock signal that is obtained by the first obtaining unit 10, where $$B_t = \mod\left[\sum_{n=0}^{t-1} Mr_d(n), 2^p\right],$$

t is a positive integer, and $Mr_d(0)$ is an initial value, a first determining unit 30 configured to when Ct obtained by means of calculation according to $Mr_d(t-1)$ is less than or equal to a threshold, determine that $Mr_d(t-1)$ is a target $Mr_d$, where $C_t=B_t-A_t$, At is included in an RTS packet that is sent by a transmitter and that is received by the receiver last time, and $$A_t = \mod\left[\sum_{n=0}^{t} M_d(n), 2^p\right],$$

$M_d(n)$ is frequency offset information, and $M_d(n)=M_q(n)-M_{nom}$ m, $M_q(n)$ is a quantity, determined by the transmitter within an nth RTS period, of rising edges of the common reference clock signal, $M_{nom}$ is a reference quantity, obtained by the transmitter, of clock periods of the common reference clock signal within the $n^{th}$ RTS period, P is a bit width of a counter in the transmitter, the counter in the transmitter is configured to record the quantity, in the transmitter within the $n^{th}$ RTS period, of rising edges of the common reference clock signal, and n is a positive integer, a first frequency-division processing unit 40 configured to perform frequency division on the common reference clock signal using the target $Mr_d$ as a frequency dividing coefficient, to obtain a first clock signal, where a frequency of the first clock signal is $\overline{f_{sN}}$, and a clock-recovery processing unit 50 configured to perform frequency multiplication processing on the first clock signal obtained by the first frequency-division processing unit 40 to obtain a service clock signal, where a frequency of the service clock signal is $\overline{f_s}$, $\overline{f_s}=\overline{f_{sN}}\times N$, and N is a multiplication factor. The clock-recovery processing unit 50 may be further a clock frequency multiplier, and N is a multiplication factor of the clock frequency multiplier.

The first calculation unit 20 includes a frequency-division processing subunit (not shown) configured to perform frequency division on the common reference clock signal using $Mr_d(t-1)$ as a frequency dividing coefficient, to obtain a second clock signal, where a frequency of the second clock signal is $\overline{f_{sN(t-1)}}$, and a period of the second clock signal is $\overline{T_{(t-1)}}$, a first integral-calculation subunit (not shown) configured to, when the period $\overline{T_{(t-1)}}$ of the second clock signal obtained by the frequency-division processing subunit starts, perform summation on $Mr_d$ using a formula $B_t=B_{t-1}+Mr_d(t-1)$, and store $B_t$ obtained after the summation into a counter in the receiver, and a first numeric-value turnover subunit (not shown) configured to, when $B_t$ stored by the first integral-calculation subunit 22 is greater than 2p, obtain a new $\overline{B_t}$ by means of calculation using a formula $\overline{B_t}=B_t-2^p$.

When t is greater than 1, $Mr_d(t-1)$ is $Mr_d(t-2)$.

Preferably, the receiver further includes an adjustment unit (not shown) configured to generate a new $Mr_d$ according to a value of $Mr_d(t-1)$ when $C_t$ obtained by means of calculation according to $Mr_d(t-1)$ is greater than the threshold, in this case, the first calculation unit 20 is further configured to recalculate $B_t$ according to the new $Mr_d$ and the common reference clock signal, and recalculate $C_t$ according to $B_t$ that is obtained after the recalculation, until $C_t$ that is obtained after the recalculation is less than or equal to the threshold, and the first determining unit 30 is further configured to when $C_t$ that is obtained after the recalculation by the first calculation unit 20 is less than or equal to the threshold, determine that the new $Mr_d$ is the target $Mr_d$.

Further, the adjustment unit includes a transition detection subunit (not shown) configured to perform transition detection filtering on $C_t$, to obtain a smooth $C_t$, a loop filtering subunit (not shown) configured to perform loop filtering on the smooth $C_t$ obtained by the transition detection subunit to obtain an adjustment factor $\Delta M_{rd}$ used for adjusting the value of $Mr_d(t-1)$, and an adjustment subunit (not shown) configured to adjust the value of $Mr_d(t-1)$ according to the adjustment factor $\Delta M_{rd}$ obtained by the loop filtering subunit to obtain the new $Mr_d$.

In the foregoing solutions, optionally, the RTS packet further includes the bit width P of the counter in the transmitter, and/or the reference quantity $M_{nom}$, in the transmitter, of the common reference clock signal within the $n^{th}$ RTS period.

Figure 9:
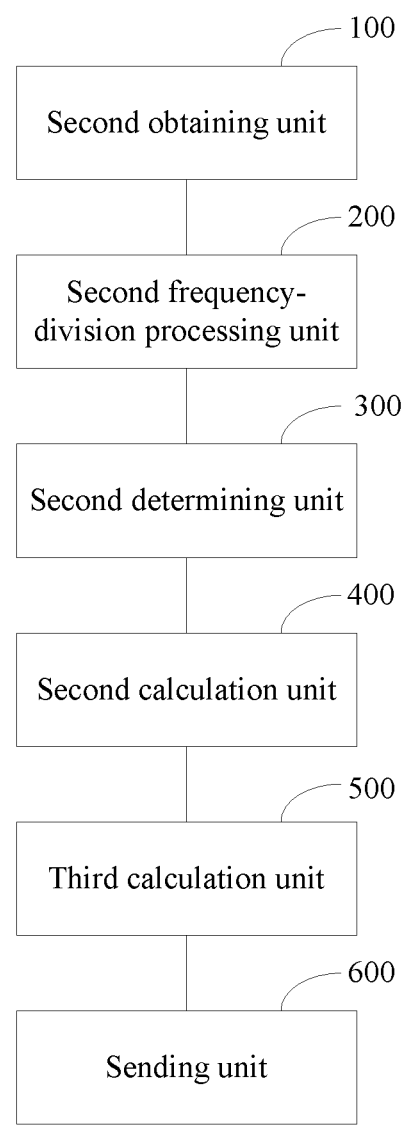
FIG. 9 is a schematic structural diagram of a transmitter according to an embodiment of the present disclosure.

A transmitter is further provided, which may be configured to execute the method shown in FIG. 3. As shown in FIG. 9, the transmitter includes a second obtaining unit 100 configured to obtain a service clock signal, where a frequency of the service clock signal is $f_s$, a second frequency-division processing unit 200 configured to divide the frequency $f_s$ of the service clock signal, obtained by the second obtaining unit 100, by a factor N, and determine an RTS period T of sending an RTS packet by the transmitter, where $$T = \frac{N}{f_s},$$

and N is greater than 1, a second determining unit 300 configured to determine a quantity $M_q(n)$ of clock periods of a common reference clock signal within an nth RTS period T determined by the second frequency-division processing unit 200, where a frequency of the common reference clock signal is $f_n$, a second calculation unit 400 configured to calculate information $M_d(n)$ about a frequency offset between the frequency $f_s$ of the service clock signal and the frequency $f_n$ of the common reference clock signal using a formula $M_d(n)=M_q(n)-M_{nom}$ and $M_q(n)$ that is determined by the second determining unit 300, where $M_{nom}$ is a reference quantity, obtained by the transmitter, of clock periods of the common reference clock signal within the nth RTS period T, and n is a positive integer, a third calculation unit 500 configured to calculate $A_t$ using a formula $$A_t = \mod\left[\sum_{n=0}^{t} M_d(n), 2^P\right]$$

and according to the frequency offset information $M_d(n)$ calculated by the second calculation unit 400, where P is a bit width of a counter in the transmitter, and the counter in the transmitter is configured to record a quantity, in the transmitter within the nth RTS period, of rising edges of the common reference clock signal, and a sending unit 600 configured to send the RTS packet to a receiver, where the RTS packet includes $A_t$ calculated by the third calculation unit 500.

The third calculation unit 500 further includes a second integral-calculation subunit (not shown) configured to perform summation on the frequency offset information $M_d(n)$ using a formula $A_t = A_{t-1} + M_d(t)$, and store $A_t$ obtained after the summation into the counter in the transmitter, and a second numeric-value turnover subunit (not shown) configured to when $A_t$ obtained by the second integral-calculation subunit is greater than $2^P$, obtain a new $\overline{A_t}$ by means of calculation using a formula $\overline{A_t} = A_t - 2^P$.

In addition, a clock synchronization system is further provided, including the foregoing transmitter and receiver.

Moreover, an embodiment of the present disclosure further provides a receiver. The receiver may be a host server, personal computer PC, portable computer or terminal that has a computing capability, or the like. Specific implementation of the receiver is not limited in a specific embodiment.

Figure 10:
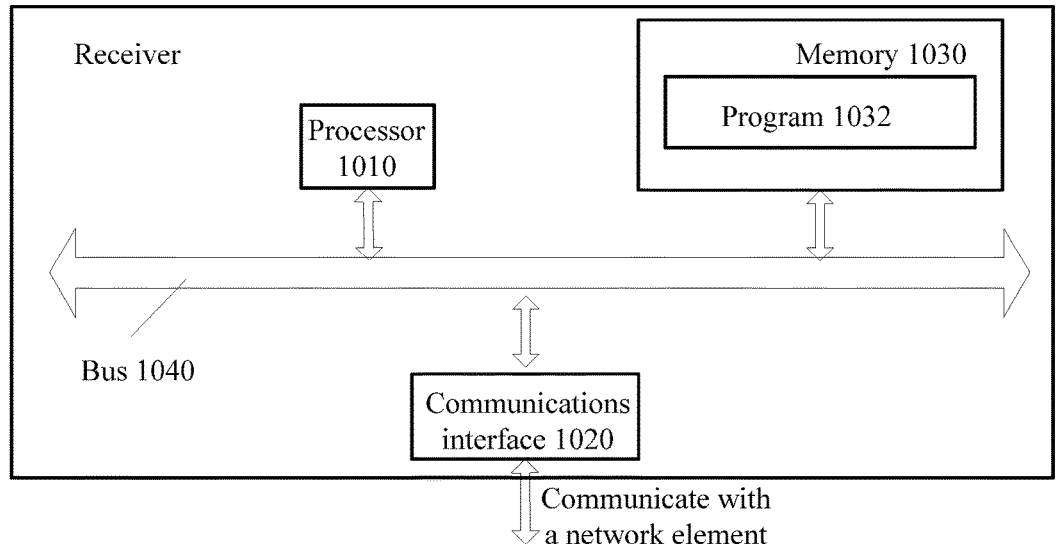
FIG. 10 is a schematic structural diagram of a receiver according to an embodiment of the present disclosure.

FIG. 10 is a schematic structural diagram of a receiver according to an embodiment. The receiver shown in FIG. 10 may be configured to execute the method shown in FIG. 4. In addition, the receiver shown in FIG. 10 may be configured to implement the receiver shown in FIG. 8. Referring to FIG. 10, the receiver includes a processor 1010, a communications interface 1020, a memory 1030, and a bus 1040.

The processor 1010, the communications interface 1020, and the memory 1030 implement communication with each other using the bus 1040.

The processor 1010 is configured to execute a program 1032.

Further, the program 1032 may include program code, where the program code includes a computer operation instruction.

The processor 1010 may be a central processing unit (CPU), may be an application-specific integrated circuit (ASIC), or one or more integrated circuits configured to implement this embodiment of the present disclosure.

The memory 1030 is configured to store the program 1032. The memory 1030 may include a high-speed random access memory (RAM), and may further include a non-volatile memory, such as at least one disk memory. The program 1032 may further include obtaining a common reference clock signal, where a frequency of the common reference clock signal is $f_n$, determining $B_t$ according to the common reference clock signal and $Mr_d(t-1)$, where $$B_t = \mod\left[\sum_{n=0}^{t-1} Mr_d(n), 2^P\right],$$

t is a positive integer, and $Mr_d(0)$ is an initial value, when $C_t$ obtained by means of calculation according to $Mr_d(t-1)$ is less than or equal to a threshold, determining that $Mr_d(t-1)$ is a target $Mr_d$, where $C = B_t - A_t$, At is included in an RTS packet that is sent by a transmitter and that is received by the receiver last time, and $$A_t = \mod\left[\sum_{n=0}^{t} M_d(n), 2^P\right],$$

$M_d(n)$ is frequency offset information, and $M_d(n) = M_q(n) - M_{nom}$, $M_q(n)$ is a quantity, determined by the transmitter within an $n^{th}$ RTS period, of rising edges of the common reference clock signal, $M_{nom}$ is a reference quantity, obtained by the transmitter, of clock periods of the common reference clock signal within the $n^{th}$ RTS period, P is a bit width of a counter in the transmitter, the counter in the transmitter is configured to record the quantity, in the transmitter within the $n^{th}$ RTS period, of rising edges of the common reference clock signal, and n is a positive integer, performing frequency division on the common reference clock signal using the target $Mr_d$ as a frequency dividing coefficient, to obtain a first clock signal, where a frequency of the first clock signal is $\overline{f_{sN}}$, and performing frequency multiplication processing on the first clock signal, to obtain a service clock signal, where a frequency of the service clock signal is $\overline{f_s}$, $\overline{f_s} = \overline{f_{sN}} \times N$, and N is a multiplication factor.

Optionally, the determining $B_t$ according to the common reference clock signal and $Mr_d(t-1)$ further includes performing frequency division on the common reference clock signal using $Mr_d(t-1)$ as a frequency dividing coefficient, to obtain a second clock signal, where a frequency of the second clock signal is $\overline{f_{sN(t-1)}}$, and a period of the second clock signal is $\overline{T_{(t-1)}}$, when the period $\overline{T_{(t-1)}}$ of the second clock signal starts, performing summation on $Mr_d$ using a formula $B_t = B_{t-1} + Mr_d(t-1)$, and storing $B_t$ obtained after the summation into a counter in the receiver, and when $B_t > 2^P$, obtaining a new $\overline{B_t}$ by means of calculation using a formula $\overline{B_t} = B_t - 2^P$.

Optionally, when t is greater than 1, $Mr_d(t-1)$ is $Mr_d(t-2)$.

Optionally, the program 1032 further includes generating a new $Mr_d$ according to a value of $Mr_d(t-1)$ when $C_t$ obtained by means of calculation according to $Mr_d(t-1)$ is greater than the threshold, recalculating $B_t$ according to the new $Mr_d$ and the common reference clock signal, recalculating $C_t$ according to $B_t$ that is obtained after the recalculation, and when $C_t$ that is obtained after the recalculation is less than or equal to the threshold, determining that the new $Mr_d$ is the target $Mr_d$.

Optionally, the generating a new $Mr_d$ according to a value of $Mr_d(t-1)$ when $C_t$ obtained by means of calculation according to $Mr_d(t-1)$ is greater than the threshold includes performing transition detection filtering on $C_t$, to obtain a smooth $C_t$, performing loop filtering on the smooth $C_t$, to obtain an adjustment factor $\Delta Mr_d$ used for adjusting the value of $Mr_d(t-1)$, and adjusting the value of $Mr_d(t-1)$ according to the adjustment factor $\Delta Mr_d$, to obtain the new $Mr_d$.

Optionally, the RTS packet further includes the bit width P of the counter in the transmitter, and/or the reference quantity $M_{nom}$, in the transmitter, of the common reference clock signal within the $n^{th}$ RTS period.

Moreover, a transmitter is further provided. The transmitter may be a host server, personal computer PC, or portable computer or terminal that has a computing capability. Specific implementation of the transmitter is not limited in a specific embodiment.

Figure 11:
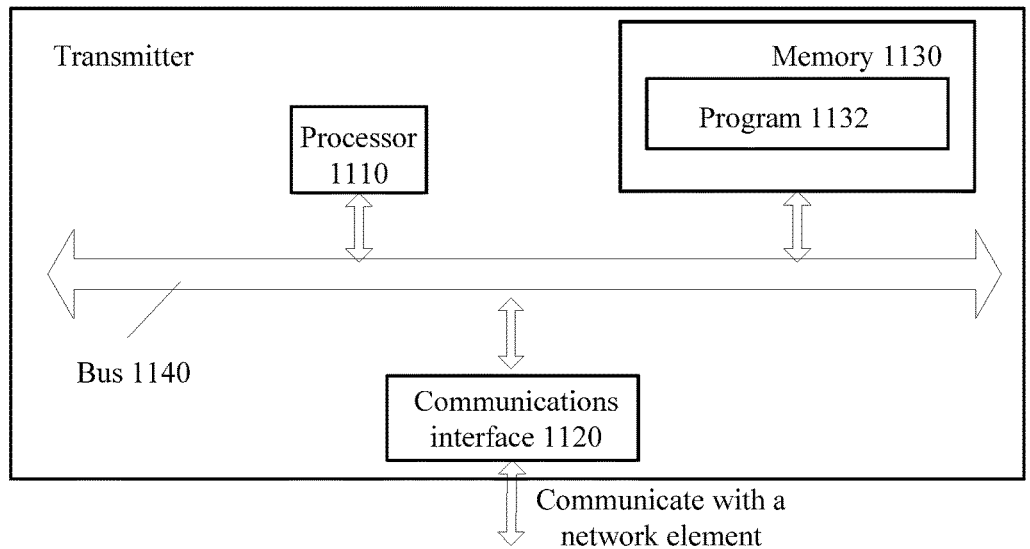
FIG. 11 is a schematic structural diagram of a transmitter according to an embodiment of the present disclosure.

FIG. 11 is a schematic structural diagram of a transmitter according to an embodiment. The transmitter shown in FIG. 11 may be configured to execute the method shown in FIG. 3. In addition, the transmitter shown in FIG. 11 may be configured to implement the transmitter shown in FIG. 9. Referring to FIG. 11, the transmitter includes a processor 1110, a communications interface 1120, a memory 1130, and a bus 1140.

The processor 1110, the communications interface 1120, and the memory 1130 implement communication with each other using the bus 1140.

The processor 1110 is configured to execute a program 1132.

Further, the program 1132 may include program code, where the program code includes a computer operation instruction.

The processor 1110 may be a CPU, may be an ASIC, or one or more integrated circuits configured to implement this embodiment of the present disclosure.

The memory 1130 is configured to store the program 1132. The memory 1130 may include a high-speed RAM, and may further include a non-volatile memory, such as at least one disk memory. The program 1132 may further include obtaining a service clock signal, where a frequency of the service clock signal is $f_s$, dividing the frequency $f_s$ of the service clock signal by a factor N, and determining an RTS period T of sending an RTS packet by the transmitter, where $$T = \frac{N}{f_s},$$

and N is greater than 1, determining a quantity $M_q(n)$ of clock periods of a common reference clock signal within an $n^{th}$ RTS period T, where a frequency of the common reference clock signal is $f_n$, calculating information $M_d(n)$ about a frequency offset between the frequency $f_s$ of the service clock signal and the frequency $f_n$ of the common reference clock signal using a formula $M_d(n)=M_q(n)-M_{nom}$ and $M_q(n)$, where $M_{nom}$ is a reference quantity, obtained by the transmitter, of clock periods of the common reference clock signal within the $n^{th}$ RTS period T, and n is a positive integer, calculating $A_t$ using a formula $$A_t = \mathrm{mod}\left[\sum_{n=0}^{t} M_d(n), 2^P\right]$$

and according to the frequency offset information $M_d(n)$, where P is a bit width of a counter in the transmitter, and the counter in the transmitter is configured to record a quantity, in the transmitter within the $n^{th}$ RTS period, of rising edges of the common reference clock signal, and sending the RTS packet to a receiver, where the RTS packet includes $A_t$.

Optionally, calculating $A_t$ using a formula $$A_t = \mathrm{mod}\left[\sum_{n=0}^{t} M_d(n), 2^P\right]$$

and according to the frequency offset information $M_d(t)$ includes performing summation on the frequency offset information $M_d(n)$ using a formula $A_t=A_{t-1}+M_d(t)$, and storing $A_t$ obtained after the summation into the counter in the transmitter, and when $A_t>2^P$, obtaining a new $\overline{A}_t$ by means of calculation using a formula $\overline{A}_t=A_t-2^P$.

It should be noted that the embodiments in this application are all described in a progressive manner. Each embodiment focuses on a difference from other embodiments. For same or similar parts in the embodiments, reference may be made to these embodiments. The apparatus disclosed in the embodiments corresponds to the method disclosed in the embodiments, and therefore is described briefly. For related parts, reference may be made to descriptions in the method embodiments.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or a combination of software and hardware depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented using a processor directly, or a combination of a software module and a processor. The software module may be disposed in a RAM, a ROM, an electrically programmable ROM, an electrically erasable programmable ROM, a register, a hard disk, a removable disk, a compact disc ROM (CD-ROM), or any other form of memory well-known in the art. The processor is coupled with a memory that includes the software module. The processor may execute the method in the embodiments by accessing the software module in the memory.

What is claimed is:

1. A clock synchronization method, comprising:
obtaining, by a receiver, a common reference clock signal, a frequency of the common reference clock signal being $f_n$;
determining, by the receiver, $B_t$ of the receiver based on the common reference clock signal and $Mr_d(t-1)$, the $$B_t = \mathrm{mod}\left[\sum_{n=0}^{t-1} Mr_d(n), 2^P\right],$$

t being a positive integer, the n being a positive integer, and $Mr_d(0)$ being an initial frequency offset value preset by the receiver;
determining, by the receiver, that the $Mr_d(t-1)$ indicates a phase offset of a receiver service clock signal when $C_t$ according to the $Mr_d(t-1)$ is less than or equal to a threshold, the $C_t=B_t-A_t$, the $A_t$ being part of a residual time stamp (RTS) packet received from a transmitter, the $$A_t = \mod\left[\sum_{n=0}^{t} M_d(n), 2^P\right],$$

the $M_d(n)$ being frequency offset information, the frequency offset information $M_d(n)=M_q(n)-M_{nom}$, the $M_q(n)$ being a quantity of rising edges of the common reference clock signal within an $n^{th}$ RTS period from the transmitter, the $M_{nom}$ being a reference quantity of clock periods of the common reference clock signal within the $n^{th}$ RTS period from the transmitter, the P being a bit width of a counter in the transmitter configured to record a quantity of rising edges $M_q(n)$;

performing, by the receiver, frequency division on the common reference clock signal to compensate for the phase offset of the service clock signal using the $Mr_d(t-1)$ as a frequency dividing coefficient to obtain a first clock signal when the $C_t$ according to the $Mr_d(t-1)$ is less than or equal to the threshold, a frequency of the first clock signal being $\overline{f_{sN}}$; and performing, by the receiver, frequency multiplication processing on the first clock signal to adjust the receiver service clock signal to be consistent with a phase of a transmitter service clock signal, a frequency of the receiver service clock signal being $\overline{f_s}$, the $\overline{f_s}=\overline{f_{sN}}\times N$, and the N being a multiplication factor.

2. The method of claim 1, wherein determining the $B_t$ comprises:
performing, by the receiver, the frequency division on the common reference clock signal using the $Mr_d(t-1)$ as the frequency dividing coefficient to obtain a second clock signal, a frequency of the second clock signal being $\overline{f_{sN(t-1)}}$, and a period of the second clock signal being $\overline{T_{(t-1)}}$;
performing, by the receiver, summation on the $Mr_d(t-1)$ using $B_t=B_t+Mr_d(t-1)$;
storing the $B_t$ obtained after the summation into a counter in the receiver when the $\overline{T_{(t-1)}}$ starts; and
obtaining, by the receiver, a new $\overline{B_t}$ using $\overline{B_t}=B_t-2^P$ when the $B_t>2^P$.

3. The method of claim 1, further comprising replacing the $Mr_d(t-1)$ with $Mr_d(t-2)$ when the t is greater than one.

4. The method of claim 2, further comprising:
generating, by the receiver, a new threshold when the $C_t$ obtained according to the $Mr_d(t-1)$ is greater than the threshold;
recalculating, by the receiver, the $B_t$ based on the new threshold and the common reference clock signal when the $C_t$ according to the $Mr_d(t-1)$ is greater than the threshold;
recalculating, by the receiver, the $C_t$ based on the $B_t$ obtained after the recalculation; and
determining, by the receiver, that the new threshold comprises the $Mr_d(t-1)$ when the $C_t$ obtained after the recalculation is less than or equal to the threshold.

5. The method of claim 4, wherein generating the new threshold comprises:
performing, by the receiver, transition detection filtering on the $C_t$ to obtain a smooth $C_t$;

performing, by the receiver, loop filtering on the smooth $C_t$ to obtain an adjustment factor $\Delta M_{rd}$ for adjusting the value of the $Mr_d(t-1)$; and
adjusting, by the receiver, the value of the $Mr_d(t-1)$ based on the $\Delta M_{rd}$ to obtain the new threshold.

6. The method of claim 1, wherein the RTS packet further comprises the P and the $M_{nom}$.

7. The method of claim 1, wherein the RTS packet further comprises the P.

8. The method of claim 1, wherein the RTS packet further comprises the $M_{nom}$.

9. A clock synchronization method, comprising:
obtaining, by a transmitter, a transmitter service clock signal, a frequency of the transmitter service clock signal comprising $f_s$;
dividing, by the transmitter, the frequency $f_s$ of the transmitter service clock signal by a factor N;
determining, by the transmitter, a residual time stamp (RTS) period T for sending an RTS packet, where the period $$T = \frac{N}{f_s},$$

and the N are greater than one;
determining, by the transmitter, a quantity of clock periods of a common reference clock signal within an $n^{th}$ period T ($M_q(n)$), a frequency of the common reference clock signal being $f_n$ and a RTS packet comprises $M_q(n)$;
calculating, by the transmitter, information about a frequency offset $M_d(n)$ between the $f_s$ and the $f_n$ using $M_d(n)=M_q(n)-M_{nom}$, the $M_{nom}$ being a reference quantity of clock periods of the common reference clock signal within the $n^{th}$ T obtained by the transmitter, and the n being a positive integer;
calculating, by the transmitter, $A_t$ using $$A_t = \mod\left[\sum_{n=0}^{t} M_d(n), 2^P\right]$$

and according to the $M_d(n)$, the P being a bit width of a counter in the transmitter configured to record a quantity of rising edges of the common reference clock signal in the transmitter within the $n^{th}$ T; and
sending, by the transmitter, the RTS packet comprising the $A_t$ of the transmitter to a receiver for the receiver to adjust the receiver service clock signal to be consistent with a phase of the transmitter service clock signal.

10. The method of claim 9, wherein calculating the $A_t$ comprises:
performing, by the transmitter, summation on the $M_d(n)$ using $A_t=A_{t-1}+M_d(t)$;
storing, by the transmitter, the $A_t$ obtained after the summation into the counter in the transmitter; and
obtaining, by the transmitter, a new $\overline{A_t}$ using $\overline{A_t}=A_t-2^P$ when the $A_t>2^P$.

11. A receiver, comprising:
a memory comprising instructions; and
a processor coupled to the memory, the instructions, when executed by the processor, cause the processor to:
obtain a common reference clock signal, a frequency of the common reference clock signal being $f_n$;

determine $B_t$ of the receiver based on $Mr_d(t-1)$ and the common reference clock signal, the $$B_t = \mathrm{mod}\left[\sum_{n=0}^{t-1} Mr_d(n), 2^P\right],$$

the t being a positive integer, the n being a positive integer, and $Mr_d(0)$ being an initial frequency offset value preset by the receiver;

determine that the $Mr_d(t-1)$ indicates a phase offset of a receiver service clock signal when $C_t$ according to the $Mr_d(t-1)$ is less than or equal to a threshold, the $C_t = B_t - A_t$, the $A_t$ being part of a residual time stamp (RTS) packet received from a transmitter, the $$A_t = \mathrm{mod}\left[\sum_{n=0}^{t} M_d(n), 2^P\right],$$

the $M_d(n)$ being frequency offset information, the frequency offset information $M_d(n) = M_q(n) - M_{nom}$, the $M_q(n)$ being a quantity of rising edges of the common reference clock signal within an $n^{th}$ RTS period from the transmitter, the $M_{nom}$ being a reference quantity of clock periods of the common reference clock signal within the $n^{th}$ RTS period from the transmitter, the P being a bit width of a counter in the transmitter configured to record a quantity of rising edges $M_q(n)$;

perform frequency division on the common reference clock signal to compensate for the phase offset of the service clock signal using the $Mr_d(t-1)$ as a frequency dividing coefficient to obtain a first clock signal when the $C_t$ according to the $Mr_d(t-1)$ is less than or equal to the threshold, a frequency of the first clock signal being $\overline{f_{sN}}$; and perform frequency multiplication processing on the first clock signal to adjust the receiver service clock signal to be consistent with a phase of the transmitter service clock signal, a frequency of the receiver service clock signal being $\overline{f_s}$, the $\overline{f_s} = \overline{f_{sN}} \times N$, and the N being a multiplication factor.

12. The receiver of claim 11, wherein the instructions, when executed, further cause the processor to be configured to:

perform the frequency division on the common reference clock signal using the $Mr_d(t-1)$ as the frequency dividing coefficient to obtain a second clock signal, a frequency of the second clock signal comprising $\overline{f_{sN(t-1)}}$, and a period of the second clock signal being $\overline{T_{(t-1)}}$;

perform summation on the $Mr_d(t-1)$ using $B_t = B_{t-1} + Mr_d(t-1)$;

store the $B_t$ obtained after the summation into a counter in the receiver when the $\overline{T_{(t-1)}}$ starts; and obtain a new $\overline{B_t}$ using $\overline{B_t} = B_t - 2^P$ when the $B_t$ is greater than $2^P$.

13. The receiver of claim 11, further comprising replacing the $Mr_d(t-1)$ with $Mr_d(t-2)$ when the t is greater than one.

14. The receiver according to claim 12, wherein the instructions, when executed by the processor, further cause the processor to be configured to:

generate a new threshold;
recalculate the $B_t$ based on the new threshold and the common reference clock signal;

recalculate the $C_t$ based on the $B_t$ obtained after the recalculation, until the $C_t$ obtained after the recalculation is less than or equal to the threshold; and determine that the new threshold comprises the $Mr_d(t-1)$ when the $C_t$ obtained after the recalculation is less than or equal to the threshold.

15. The receiver of claim 14, wherein the instructions, when executed by the processor, further cause the processor to be configured to:

perform transition detection filtering on the $C_t$ to obtain a smooth $C_t$;

perform loop filtering on the smooth $C_t$ to obtain an adjustment factor $\Delta M_{rd}$ for adjusting the value of the $Mr_d(t-1)$; and adjust the value of the $Mr_d(t-1)$ based on the $\Delta M_{rd}$ to obtain the new threshold.

16. The receiver of claim 11, wherein the RTS packet further comprises the P and the $M_{nom}$.

17. The receiver of claim 11, wherein the RTS packet further comprises the P.

18. The receiver of claim 11, wherein the RTS packet further comprises the $M_{nom}$.

19. A transmitter, comprising:
a memory comprising instructions; and
a processor coupled to the memory, the instructions, when executed, causing the processor to be configured to:

obtain a transmitter service clock signal, a frequency of the service clock signal comprising $f_s$;

divide the frequency $f_s$ of the service clock signal by a factor N;

determine a residual time stamp (RTS) period T of sending an RTS packet, where the period $$T = \frac{N}{f_s},$$

and the N are greater than one;

determine a quantity of clock periods of a common reference clock signal within an $n^{th}$ period T ($M_q(n)$), a frequency of the common reference clock signal being frequency $f_n$ and an RTS packet comprises $M_q(n)$;

calculate information about a frequency offset $M_d(n)$ between the frequency $f_s$ of the service clock signal and the $f_n$ using $M_d(n) = M_q(n) - M_{nom}$, the $M_{nom}$ being a reference quantity of clock periods of the common reference clock signal within the $n^{th}$ period T from the transmitter, and the n being a positive integer;

calculate $A_t$ of the transmitter, using $$A_t = \mathrm{mod}\left[\sum_{n=0}^{t} M_d(n), 2^P\right]$$

and according to the $M_d(n)$, the P being a bit width of a counter in the transmitter, where the counter is configured to record a quantity of rising edges of the common reference clock signal in the transmitter within the $n^{th}$ period T; and send the RTS packet comprising the $A_t$ of the transmitter to a receiver for the receiver to adjust the receiver service clock signal to be consistent with a phase of the transmitter service clock signal.

20. The transmitter of claim 19, wherein the instructions, when executed by the processor, further cause the processor to be configured to:

perform summation on the $M_d(n)$ using $A_t=A_{t-1}+M_d(t)$;
store the $A_t$ obtained after the summation into the counter in the transmitter; and
obtain a new $\overline{A_t}$ using $\overline{A_t}=A_t-2^p$ when the $A_t$ is greater than $2^p$.

* * * * *

UNITED STATES PATENT AND TRADEMARK OFFICE
CERTIFICATE OF CORRECTION

PATENT NO. : 10,291,446 B2
APPLICATION NO. : 15/965362
DATED : May 14, 2019
INVENTOR(S) : Chuan Xu et al.

Page 1 of 1

It is certified that error appears in the above-identified patent and that said Letters Patent is hereby corrected as shown below:

In the Claims

Column 23, Claim 2, Lines 34-48, should read:
The method of claim 1, wherein determining the $B_t$ comprises:
    performing, by the receiver, the frequency division on the common reference clock signal using the $Mr_d(t-1)$ as the frequency dividing coefficient to obtain a second clock signal, a frequency of the second clock signal being $\overline{f_{sN(t-1)}}$, and a period of the second clock signal being $\overline{T_{(t-1)}}$;
    performing, by the receiver, summation on the $Mr_d(t-1)$ using $B_t = B_{t-1} + Mr_d(t-1)$;
    storing the $B_t$ obtained after the summation into a counter in the receiver when the $\overline{T_{(t-1)}}$ starts; and
    obtaining, by the receiver, a new $\overline{B_t}$ using $\overline{B_t} = B_t - 2^P$ when the $B_t > 2^P$.

Signed and Sealed this
Twenty-third Day of July, 2019

Andrei Iancu
*Director of the United States Patent and Trademark Office*